US009003937B2

(12) United States Patent
Nobukuni

(10) Patent No.: US 9,003,937 B2
(45) Date of Patent: Apr. 14, 2015

(54) WEB MEMBER CUTTING APPARATUS FOR CUTTING WEB MEMBER THAT HAS A PLURALITY OF FIBERS INCLUDING TOWS AND WEB MEMBER CUTTING METHOD

(71) Applicant: Unicharm Corporation, Ehime (JP)

(72) Inventor: Hisaoki Nobukuni, Kanonji (JP)

(73) Assignee: Unicharm Corporation, Ehime (JP)

( * ) Notice: Subject to any disclaimer, the term of this patent is extended or adjusted under 35 U.S.C. 154(b) by 259 days.

(21) Appl. No.: 13/755,384

(22) Filed: Jan. 31, 2013

(65) Prior Publication Data

US 2013/0305894 A1 Nov. 21, 2013

(30) Foreign Application Priority Data

May 21, 2012 (JP) ................................. 2012-115784

(51) Int. Cl.
*B23D 25/04* (2006.01)
*B26D 1/60* (2006.01)
*B26D 1/56* (2006.01)

(52) U.S. Cl.
CPC ................ *B26D 1/605* (2013.01); *B26D 1/565* (2013.01); *B26D 1/60* (2013.01)

(58) Field of Classification Search
CPC ............ B26D 1/605; B26D 1/60; B26D 1/58; B26D 1/565; B26D 1/0006; B26D 7/14; B26D 7/015; B26D 7/0625; B26D 1/185; B26D 1/18; B26D 1/157; B26D 1/1575
USPC ........... 83/13, 37, 39, 56, 663, 666, 298, 311, 83/312, 205, 202, 409, 409.1, 266, 471.2, 83/485, 734, 422, 408, 42, 262, 225–230; 28/170, 147; 26/7
See application file for complete search history.

(56) References Cited

U.S. PATENT DOCUMENTS 760,800 A * 5/1904 Nice ................................ 83/455
855,301 A * 5/1907 Gobie .......................... 83/471.2

(Continued)

FOREIGN PATENT DOCUMENTS

JP 58165995 A 10/1983
JP 59169795 A 9/1984

(Continued)

OTHER PUBLICATIONS

International Search Report mailed on Jul. 16, 2013 corresponds to PCT/JP2013/063012.

*Primary Examiner* — Sean Michalski
(74) *Attorney, Agent, or Firm* — Lowe Hauptman & Ham, LLP

(57) ABSTRACT

An apparatus for cutting a continuous web includes a disc-shaped rotatable blade member for cutting the continuous web by moving in an intersecting direction, while rotating about an axis of a rotating shaft, a regulating section for regulating a relative movement of the continuous web in the predetermined direction with respect to the rotatable blade member throughout a time during which the rotatable blade member is cutting the continuous web, and a reciprocating mechanism for moving both the rotatable blade member and the regulating section along a forward path and a return path. The forward path has an equal velocity region where both the rotatable blade member and the regulating section move at a velocity value equal to a transport velocity value of the continuous web. The rotatable blade member cuts the continuous web while moving in the equal velocity region.

5 Claims, 12 Drawing Sheets

(56) References Cited

U.S. PATENT DOCUMENTS

| | | | | |
|---|---|---|---|---|
| 1,079,998 | A * | 12/1913 | Arrants | 83/487 |
| 1,434,475 | A * | 11/1922 | Austin | 83/455 |
| 1,615,901 | A * | 2/1927 | Carlson | 83/485 |
| 1,735,520 | A * | 11/1929 | Williams | 83/485 |
| 1,949,490 | A * | 3/1934 | Ross | 30/264 |
| 2,759,542 | A * | 8/1956 | Weisshuhn | 83/429 |
| 3,143,023 | A * | 8/1964 | Addin | 83/472 |
| 3,605,537 | A * | 9/1971 | Pickier | 83/121 |
| 3,657,952 | A * | 4/1972 | Brockbank et al. | 83/102 |
| 3,665,982 | A * | 5/1972 | Kvalheim | 83/404.2 |
| 3,821,915 | A * | 7/1974 | Larrable | 83/174 |
| 3,910,142 | A * | 10/1975 | Jureit et al. | 83/74 |
| 4,353,274 | A * | 10/1982 | Shimizu | 83/156 |
| 4,444,077 | A * | 4/1984 | Wise et al. | 83/319 |
| 4,452,117 | A * | 6/1984 | Brickner et al. | 83/468 |
| 4,548,108 | A * | 10/1985 | Dennis | 83/27 |
| 4,649,782 | A * | 3/1987 | Cavagna | 83/425.4 |
| 4,813,316 | A * | 3/1989 | Johnson et al. | 83/42 |
| 5,033,344 | A * | 7/1991 | Ohneda et al. | 83/262 |
| 5,046,392 | A * | 9/1991 | Keon et al. | 83/862 |
| 5,249,491 | A * | 10/1993 | Carter | 83/13 |
| 5,355,156 | A * | 10/1994 | Balzeit et al. | 346/138 |
| 5,715,738 | A * | 2/1998 | Yetman | 83/614 |
| 6,014,921 | A * | 1/2000 | Angel et al. | 83/862 |
| 6,056,682 | A * | 5/2000 | Belanger et al. | 493/340 |
| 6,119,675 | A * | 9/2000 | Akram et al. | 125/23.01 |
| 6,212,983 | B1 * | 4/2001 | Pyle | 83/34 |
| 6,308,602 | B1 * | 10/2001 | Gerber | 83/76.6 |
| 6,394,330 | B1 * | 5/2002 | Jackson | 225/2 |
| 6,418,825 | B1 * | 7/2002 | Hartmann | 83/110 |
| 6,640,855 | B2 * | 11/2003 | Giles | 144/357 |
| 6,644,154 | B2 * | 11/2003 | Wierschke et al. | 83/174 |
| 6,681,669 | B1 * | 1/2004 | Bogan | 83/176 |
| 6,732,625 | B1 * | 5/2004 | Boynton et al. | 83/482 |
| 6,782,889 | B2 * | 8/2004 | Ducci et al. | 131/84.1 |
| 6,813,985 | B2 * | 11/2004 | Gharst et al. | 83/863 |
| 7,000,658 | B1 * | 2/2006 | Soukiassian et al. | 144/3.1 |
| 7,047,856 | B2 * | 5/2006 | Nurenberg et al. | 83/471.3 |
| 7,124,672 | B2 * | 10/2006 | Marocco | 83/197 |
| 7,284,305 | B1 * | 10/2007 | Allen et al. | 26/7 |
| 7,430,948 | B2 * | 10/2008 | De Marco et al. | 83/236 |
| 7,434,373 | B2 * | 10/2008 | Pommier | 53/435 |
| 7,861,630 | B2 * | 1/2011 | Sorensen et al. | 83/42 |
| 2001/0022285 | A1 * | 9/2001 | Gambini | 209/698 |
| 2003/0079589 | A1 * | 5/2003 | Kovacs | 83/42 |
| 2004/0069106 | A1 * | 4/2004 | McAdoo | 83/34 |
| 2004/0221700 | A1 * | 11/2004 | Williams et al. | 83/236 |
| 2005/0097695 | A1 | 5/2005 | Tanaka et al. | |
| 2005/0211031 | A1 * | 9/2005 | James et al. | 83/13 |
| 2006/0179989 | A1 * | 8/2006 | James et al. | 83/284 |
| 2008/0034936 | A1 * | 2/2008 | Loibl | 83/455 |
| 2008/0110311 | A1 * | 5/2008 | Stangherlin | 83/177 |
| 2009/0211420 | A1 * | 8/2009 | Loibl | 83/485 |
| 2009/0266211 | A1 * | 10/2009 | Westfall et al. | 83/208 |
| 2010/0024621 | A1 * | 2/2010 | Van Cleave et al. | 83/471.2 |
| 2010/0257984 | A1 * | 10/2010 | Scaroni et al. | 83/13 |
| 2011/0296964 | A1 * | 12/2011 | Muller et al. | 83/23 |
| 2011/0308097 | A1 * | 12/2011 | Vollrath | 30/388 |
| 2013/0087029 | A1 * | 4/2013 | Iyatani | 83/13 |
| 2013/0305894 | A1 * | 11/2013 | Nobukuni | 83/37 |

FOREIGN PATENT DOCUMENTS

| | | | |
|---|---|---|---|
| JP | 1288556 | A | 11/1989 |
| JP | 647697 | A | 2/1994 |
| JP | 2005-040641 | | 2/2005 |
| JP | 2010125535 | A | 6/2010 |

* cited by examiner

UPSTREAM (REAR)
MD DIRECTION
DOWNSTREAM (FRONT)
Pb
Pf
51 (50)
31
21
55 (50)
12
14
1a
1
V1ai
V21=0
(=V1ai)
V1a
V50=V1ai

V1ai<V21
V50=V1ai−V21

V21 (=V1ai)

CUTTING

0<V21<V1ai

V21 (<0)

WEB MEMBER CUTTING APPARATUS FOR CUTTING WEB MEMBER THAT HAS A PLURALITY OF FIBERS INCLUDING TOWS AND WEB MEMBER CUTTING METHOD

CROSS-REFERENCE TO RELATED APPLICATIONS

The present application claims priority upon Japanese Patent Application No. 2012-115784 filed on May 21, 2012 which is herein incorporated by reference.

BACKGROUND

1. Technical Field

The present invention relates to an apparatus and a method for cutting a continuous web having a plurality of fibers including tows.

2. Related Art

Conventionally, a cleaning web member is known into which a handle member is inserted to make the web member usable for cleaning a tabletop and the like (Japanese Patent Application Laid-open Publication No. 2005-40641). Such a cleaning web member has a main body in which a plurality of fibers are layered on a base sheet, and thermoplastic fibers called tows are used as the fibers.

In the production line for the cleaning web members, a plurality of tows whose fiber direction matches a transport direction are secured by welding or the like to a base sheet that is continuous along the transport direction, so that a continuous web that is continuous in the transport direction is formed as a semi-finished product, then this continuous web is cut at a product width pitch in the transport direction, and thereby, cleaning web members in cut sheet forms are manufactured.

Here, there is an exemplary method for cutting this continuous web in which, while intermittently transporting the continuous web, and while the transport is stopped, an upper blade is moved toward a lower blade positioned on the opposite side in the thickness direction of the continuous web and thereby, the continuous web is sheared with the upper blade and the lower blade.

However, according to this method, transport of the continuous web has to be stopped every time cutting is performed and thus, productivity is poor.

Furthermore, the tows used in the continuous web are thermoplastic resin fibers. Accordingly, during shearing, due to pressing in the transport direction, which may occur at a clearance in the transport direction between the upper blade and the lower blade, tows at the cut target position are easily welded or pressure-bonded to each other. As a result, the cut edges may be bound to each other in loops and the performance (dust trapping performance during use for cleaning) of the brush section may deteriorate.

Furthermore, if the cut edges are bound to each other in loops, the volume of the cleaning web member decreases, which also lowers the performance of the brush section.

SUMMARY

The present invention has been made in view of these conventional problems, and an objective thereof is to provide a cutting apparatus and a cutting method for cutting, a continuous web that has a plurality of fibers including tows along a predetermined direction, at intervals in a predetermined direction, in which the continuous web can be cut without stopping transport of the continuous web, a good cutting performance can be achieved while suppressing pressure-bonding and welding of tows at a cut target position, and a cut sheet product formed by cutting the continuous web can be made voluminous.

In order to solve the above-described problem, a principal aspect of the invention is, a continuous web cutting apparatus for cutting a continuous web that has a plurality of fibers including tows along a predetermined direction, the continuous web being cut at intervals in the predetermined direction while being transported along a predetermined track in the predetermined direction, including a disc-shaped rotatable blade member that cuts the continuous web by moving in an intersecting direction that intersects the predetermined direction, while rotating about an axis of a rotating shaft along the predetermined direction;

a regulating section that regulates a relative movement of the continuous web in the predetermined direction with respect to the rotatable blade member throughout a time during which the rotatable blade member is cutting the continuous web; and a reciprocating mechanism that moves both the rotatable blade member and the regulating section along a forward path and a return path that are parallel to the predetermined track; wherein, in the forward path, an equal velocity region is set in which both the rotatable blade member and the regulating section move at a velocity value that is equal to a transport velocity value of the continuous web, and the rotatable blade member cuts the continuous web while moving in the equal velocity region.

Further, a continuous web cutting method for cutting, a continuous web that has a plurality of fibers including tows along a predetermined direction, at intervals in the predetermined direction, while the continuous web is transported along a predetermined track in the predetermined direction, using a disc-shaped rotatable blade member that cuts the continuous web by moving in an intersecting direction that intersects the predetermined direction, while rotating about an axis of a rotating shaft along the predetermined direction, a regulating section that can regulate a relative movement of the continuous web in the predetermined direction with respect to the rotatable blade member, and a reciprocating mechanism that moves both the rotatable blade member and the regulating section along a forward path and a return path that are parallel to the predetermined track, the method including moving, in the forward path, both the rotatable blade member and the regulating section at a velocity value that is equal to a transport velocity value of the continuous web;

cutting the continuous web using the rotatable blade member during movement at the equal velocity value; and regulating the relative movement of the continuous web with respect to the rotatable blade member using the regulating section throughout a time during which the rotatable blade member is cutting the continuous web.

Features of the invention other than the above will become clear from the description of the present specification and the drawings attached.

DESCRIPTION OF EXEMPLARY EMBODIMENTS

Figure 1:
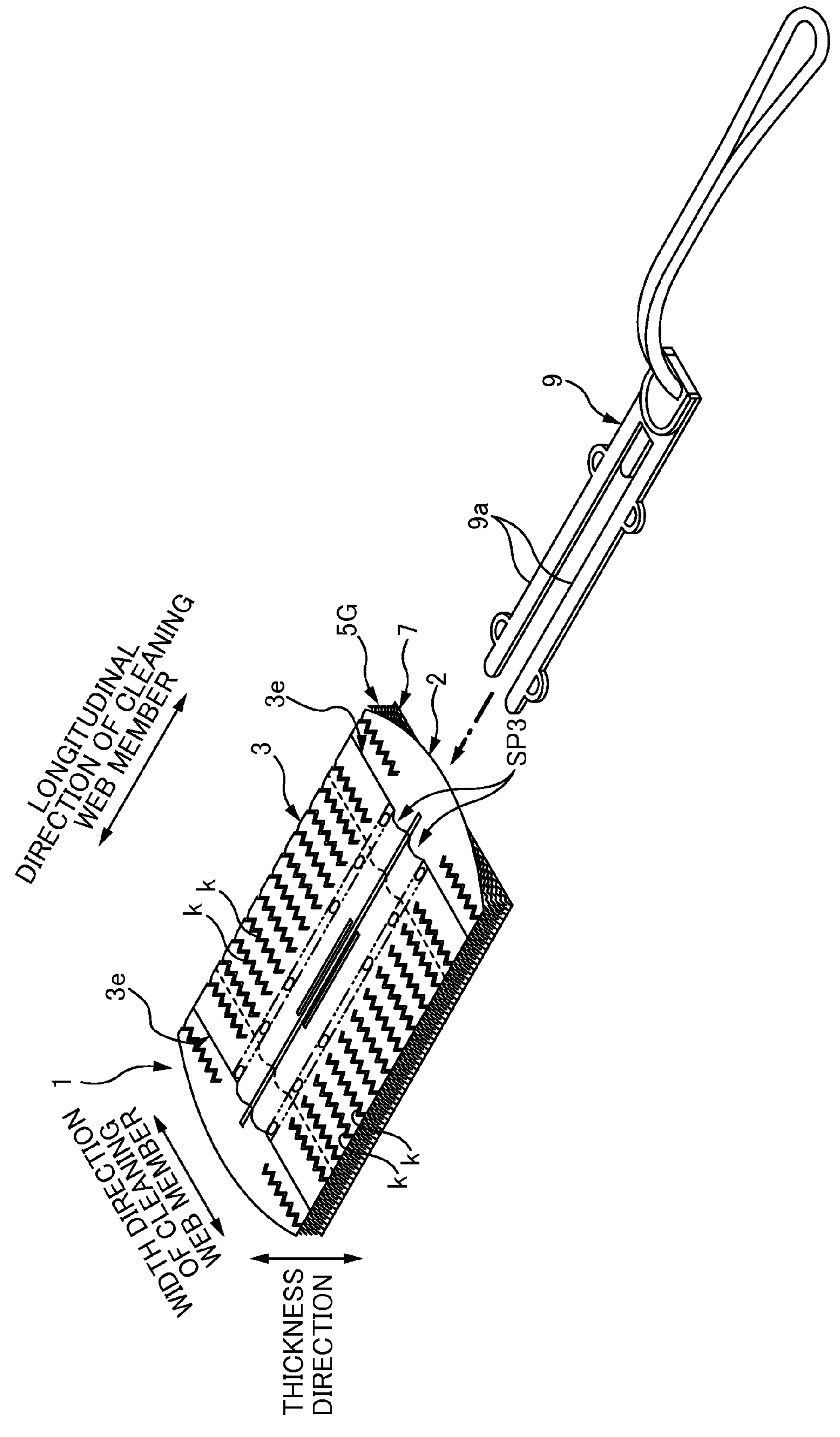
FIG. 1 is a perspective view of a cleaning web member 1.

At least the following matters will be made clear from the description of the present specification with reference to the accompanying drawings.

A continuous web cutting apparatus for cutting a continuous web that has a plurality of fibers including tows along a predetermined direction, the continuous web being cut at intervals in the predetermined direction while being transported along a predetermined track in the predetermined direction, includes a disc-shaped rotatable blade member that cuts the continuous web by moving in an intersecting direction that intersects the predetermined direction, while rotating about an axis of a rotating shaft along the predetermined direction;

a regulating section that regulates a relative movement of the continuous web in the predetermined direction with respect to the rotatable blade member throughout a time during which the rotatable blade member is cutting the continuous web; and a reciprocating mechanism that moves both the rotatable blade member and the regulating section along a forward path and a return path that are parallel to the predetermined track; wherein, in the forward path, an equal velocity region is set in which both the rotatable blade member and the regulating section move at a velocity value that is equal to a transport velocity value of the continuous web, and the rotatable blade member cuts the continuous web while moving in the equal velocity region.

With this continuous web cutting apparatus, the rotatable blade member cuts the continuous web while moving in a predetermined direction at a velocity value that is equal to the transport velocity value of the continuous web. Accordingly, when cutting the continuous web, transport of the continuous web does not have to be stopped.

Furthermore, throughout the time during which the rotatable blade member is performing cutting, the regulating section regulates relative movement of the continuous web in a predetermined direction with respect to the rotatable blade member. Accordingly, disordered movement of the continuous web, which may occur due to contact of the continuous web with the rotatable blade member that moves in the intersecting direction while rotating, can be effectively prevented, and thus, a good cutting performance can be achieved.

Furthermore, since the continuous web is cut along the intersecting direction by moving the rotatable blade member in the intersecting direction while rotating the rotatable blade member, a high cutting performance is achieved. Accordingly, with this high cutting performance, the continuous web can be reliably cut by bringing only the rotatable blade member into contact with the continuous web, and thus, the continuous web does not have to be pressed between a pair of blades for cutting. Accordingly, welding and pressure-bonding of tows at a cut target position, which may occur during the pressing, can be reliably suppressed.

Furthermore, cut fibers such as tows are in contact with the blade faces of the disc-like rotatable blade member throughout the time from when cutting of the fibers has just started until when the continuous web is completely cut by the rotatable blade member, and are loosened in the thickness direction and the like of the continuous web due to rotation of the blade faces, and thus, fibers near a cut position in the continuous web can be made very soft and voluminous. As a result, the cut sheet product formed by cutting the continuous web can be provided in a voluminous state.

It is preferable that in the continuous web cutting apparatus, the rotatable blade member moves along a width direction of the continuous web as the intersecting direction.

With this continuous web cutting apparatus, the direction intersecting with regard to the movement direction of the rotatable blade member is not the thickness direction of the continuous web but the width direction of the continuous web. Accordingly, the size of the rotatable blade member can be reduced. That is to say, when the continuous web is cut by moving the rotatable blade member in the thickness direction of the continuous web, a rotatable blade member having a diameter that is at least larger than the size in the width direction of the continuous web has to be used, and the size of the rotatable blade member inevitably increases. However, this problem can be avoided by applying the configuration in which the rotatable blade member is moved in the width direction of the continuous web.

It is preferable that in the continuous web cutting apparatus, the rotatable blade member is reciprocatably guided in the width direction and a moving operation of the rotatable blade member along the width direction during regulation of the continuous web is performed in a direction opposite to an immediately previous moving operation of the rotatable blade member performed during regulation.

With this continuous web cutting apparatus, the cutting operation by the rotatable blade member is performed as bidirectional cutting in which the continuous web is cut in both the forward path and the return path of a reciprocation of the rotatable blade member along the width direction. Accordingly, the number of times that the continuous web is cut per unit time can be increased, and the productivity improved.

It is preferable that in the continuous web cutting apparatus, the regulating section has a feed mechanism that relatively feeds the continuous web in the predetermined direction with respect to the regulating section, the cutting apparatus has the continuous web fed thereto at the transport velocity value, and in a case where a movement velocity value takes as a positive value when the regulating section moves downstream in the predetermined direction and a movement velocity value takes a negative value when the regulating section moves upstream in the predetermined direction, the feed mechanism relatively feeds the continuous web in the predetermined direction at a velocity value obtained by subtracting the movement velocity value from the transport velocity value.

With this continuous web cutting apparatus, the feed mechanism at the regulating section relatively feeds the continuous web in a predetermined direction at a velocity value obtained by subtracting the movement velocity value of the regulating section from the transport velocity value of the continuous web, and thus, the velocity value in the absolute coordinate system of the continuous web can be constantly kept equal to the transport velocity value at which the continuous web is fed into the cutting apparatus.

Further a continuous web cutting method for cutting, a continuous web that has a plurality of fibers including tows along a predetermined direction, at intervals in the predetermined direction, while the continuous web is transported along a predetermined track in the predetermined direction, using a disc-shaped rotatable blade member that cuts the continuous web by moving in an intersecting direction that intersects the predetermined direction, while rotating about an axis of a rotating shaft along the predetermined direction, a regulating section that can regulate a relative movement of the continuous web in the predetermined direction with respect to the rotatable blade member, and a reciprocating mechanism that moves both the rotatable blade member and the regulating section along a forward path and a return path that are parallel to the predetermined track, the method including moving, in the forward path, both the rotatable blade member and the regulating section at a velocity value that is equal to a transport velocity value of the continuous web;

cutting the continuous web using the rotatable blade member during movement at the equal velocity value; and regulating the relative movement of the continuous web with respect to the rotatable blade member using the regulating section throughout a time during which the rotatable blade member is cutting the continuous web.

With this continuous web cutting method, the rotatable blade member cuts the continuous web while moving in a predetermined direction at a velocity value that is equal to the transport velocity value of the continuous web. Accordingly, when cutting the continuous web, transport of the continuous web does not have to be stopped.

Furthermore, throughout the time during which the rotatable blade member is performing cutting, the regulating section regulates relative movement of the continuous web in a predetermined direction with respect to the rotatable blade member. Accordingly, disordered movement of the continuous web, which may occur due to contact of the continuous web with the rotatable blade member that moves in the intersecting direction while rotating, can be effectively prevented, and thus, a good cutting performance can be achieved.

Furthermore, since the continuous web is cut along the intersecting direction by moving the rotatable blade member in the intersecting direction while rotating the rotatable blade member, a high cutting performance is achieved. Accordingly, with this high cutting performance, the continuous web can be reliably cut by bringing only the rotatable blade member into contact with the continuous web, and thus, the continuous web does not have to be pressed between a pair of blades for cutting. Accordingly, welding and pressure-bonding of tows at a cut target position, which may occur during the pressing, can be reliably suppressed.

Furthermore, cut fibers such as tows are in contact with the blade faces of the disc-like rotatable blade member throughout the time from when cutting of the fibers has just started until when the continuous web is completely cut by the rotatable blade member, and are loosened in the thickness direction and the like of the continuous web due to rotation of the blade faces, and thus, fibers near a cut position in the continuous web can be made very soft and voluminous. As a result, the cut sheet product formed by cutting the continuous web can be provided in a voluminous state.

First Embodiment

Figure 2A:
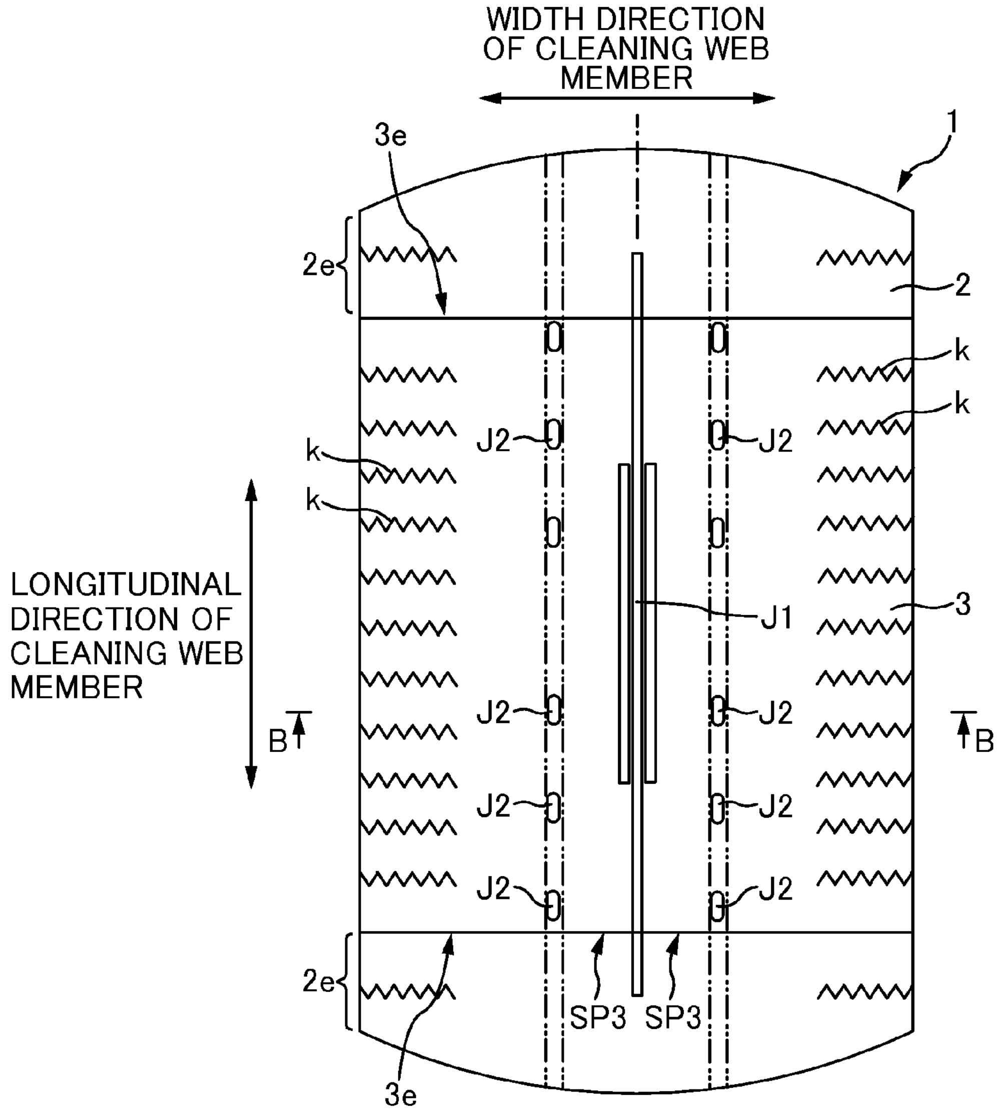
FIG. 2A is a plan view of the cleaning web member 1.

FIG. 1 is a perspective view of a cleaning web member 1 as an exemplary cut sheet product 1 formed by cutting with the cutting apparatus 20 of the first embodiment. FIG. 2A is a plan view thereof, and FIG. 2B is a cross-sectional view taken along line B-B in FIG. 2A.

As shown in FIGS. 1 and 2A, the cleaning web member 1 is in a substantially rectangular shape having a longitudinal direction and a width direction. Furthermore, as shown in FIGS. 1 and 2B, in the thickness direction, the cleaning web member 1 has a base sheet 2, an auxiliary sheet 3 that is provided so as to cover an upper face of the base sheet 2, a fiber bundle member 5G that is provided so as to cover a lower face of the base sheet 2 and forms the main brush section, and a strip sheet 7 that is provided on a lower face of the fiber bundle member 5G and forms the auxiliary brush section. Here, hollow spaces SP3, SP3 into which a handle member 9 is inserted and secured are partitioned between the auxiliary sheet 3 and the base sheet 2. Two-pronged insertion sections 9*a*, 9*a* of the handle member 9 are inserted into the hollow spaces SP3, SP3 and the cleaning web member 1 is used for cleaning a tabletop and the like with its lower face and both end portions in the width direction functioning as wiping faces.

Figure 2B:
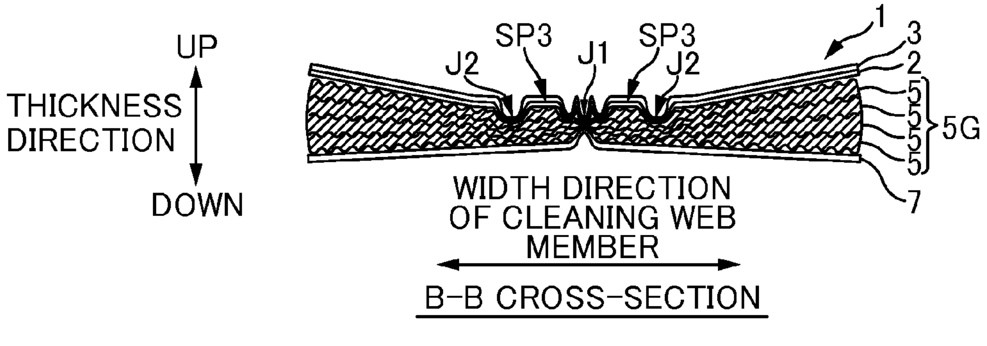
FIG. 2B is a cross-sectional view taken along line B-B in FIG. 2A.

As shown in FIG. 2B, the fiber bundle member 5G is a member in which a plurality of fiber bundles 5, 5 . . . are layered in the thickness direction. In this example, a four-layer structure is adopted in which four fiber bundles 5, 5 . . .

are layered in the thickness direction as an example of the plurality of fiber bundles, but the number of the fiber bundles 5, 5 . . . is not limited to this.

The fiber bundles 5 each have, for example, tows having a fineness of 3.5 dtex (diameter of 18 to 25 μm) as a large number of continuous fibers. Note that the fineness of the tows is not limited to 3.5 dtex. For example, any value may be selected from the range of 1.1 to 10 dtex (diameter of about 6 to about 60 μm), and the fiber bundles 5 may each have tows having a plurality of finenesses in the range of 1.1 to 10 dtex.

The tows are along the width direction of the cleaning web member 1. That is to say, the fiber direction of the tows (the longitudinal direction of each tow) is along the width direction of the cleaning web member 1. Accordingly, both end portions in the width direction basically correspond to the tips of the brush section. Note that, since these tows can be flexibly warped, when the tips of the tows are warped toward the lower face of the cleaning web member 1, the lower face side also can be a tip of the brush section. In this example, all fibers of the fiber bundles 5 are configured by tows, but there is no limitation to this. That is to say, the fiber bundles 5 may contain fibers other than tows.

Note that tows refer to fibers made of continuous filaments, and examples thereof include single-component fibers made of polyethylene terephthalate (PET), polypropylene (PP), polyethylene (PE) or the like, composite fibers having a core-sheath structure in which sheath/core is made of PE/PET or PE/PP, and side-by-side type composite fibers made of PE/PET, PE/PP, or the like. Note that the fibers may have a cross-section in the shape of a circle or other shapes. Furthermore, the fibers may have crimps, and in that case, crimping is performed during manufacture of the filaments, and the number of crimps is increased by preheated calender or hot-air treatment. The crimped tows are transferred by a transfer roll, and, at that time, a tensile force is applied in the longitudinal direction of the filaments and then released. By repeating this processing, the continuous filaments of the tows are opened so that each of them are independently separated.

As shown in FIGS. 1, 2A, and 2B, both the base sheet 2 and the auxiliary sheet 3 are sheets of substantially a rectangular planar shape. Although the base sheet 2 and the auxiliary sheet 3 have the same dimensions in the width direction, the base sheet 2 has longitudinal direction set longer than the auxiliary sheet 3. Accordingly, the auxiliary sheet 3 is layered on the base sheet 2 such that both end portions 2*e*, 2*e* in the longitudinal direction of the base sheet 2 project outward by a predetermined length from both ends 3*e*, 3*e* in the longitudinal direction of the auxiliary sheet 3.

Furthermore, in this example, zigzag cuts k, k . . . along the width direction are formed with space therebetween in the longitudinal direction, at both end portions in the width direction of both of the base sheet 2 and the auxiliary sheet 3. These cuts k, k . . . form a plurality of zigzag strip pieces along the width direction at the end portions in the width direction of the base sheet 2 and the auxiliary sheet 3. Note that the cuts k, k . . . are not essential.

The base sheet 2 and the auxiliary sheet 3 are made of, for example, a nonwoven fabric containing thermoplastic fibers. Examples of the thermoplastic fibers include PE, PP, PET fibers, composite fibers of PE and PET (e.g., composite fibers having a core-sheath structure with a PE core and a PET sheath), composite fibers of PE and PP (e.g., composite fibers having a core-sheath structure with a PET core and a PE sheath), and the like. The nonwoven fabric may be in the form of a thermal bond nonwoven fabric, a spunbond nonwoven fabric, a spunlace nonwoven fabric, or the like. Note that the material of the base sheet 2 and the auxiliary sheet 3 is not limited to nonwoven fabric.

The strip sheet 7 is made of a flexible sheet such as a nonwoven fabric containing thermoplastic fibers or a thermoplastic resin film, and is formed substantially in the shape of a rectangle having substantially the same plane size as that of the base sheet 2. Zigzag cuts (not shown) along the width direction are formed with spaces therebetween in the longitudinal direction at the end portions in the width direction of the strip sheet 7. These cuts form a plurality of zigzag strip pieces (not shown) along the width direction, at the end portions in the width direction of the strip sheet 7. Note that the strip sheet 7 is not essential.

The auxiliary sheet 3, the base sheet 2, all the four fiber bundles 5, 5, 5, 5 of the fiber bundle member 5G, and the strip sheet 7 are layered in this order in the thickness direction and, as shown in FIGS. 2A and 2B, are joined into one piece by forming a plurality of weld-joining sections J1, J2, J2, . . . .

For example, the first weld-joining section J1 is formed in the shape of a straight line along the longitudinal direction at the center position in the width direction, and the first weld-joining section J1 weld-joins all layers in the thickness direction of the cleaning web member 1 (i.e., the entire structure of the auxiliary sheet 3, the base sheet 2, all the four fiber bundles 5, 5, 5, 5 of the fiber bundle member 5G, and the strip sheet 7).

Furthermore, the plurality of island-like second weld-joining sections J2, J2, . . . are formed at intervals along the longitudinal direction, at positions spaced away by a predetermined distance from both sides in the width direction of the first weld-joining section J1. The second weld-joining sections J2 are formed mainly in order to form, in cooperation with the first weld-joining section J1, the above-described hollow spaces SP3, SP3 into which the handle member 9 is to be inserted and secured between the auxiliary sheet 3 and the base sheet 2. Accordingly, as shown in FIG. 2B, the second weld-joining sections J2 join the auxiliary sheet 3, the base sheet 2, and two fiber bundles 5, 5 located closer to the base sheet 2, which are upper layers in the thickness direction, but do not join two fiber bundles 5, 5 located below these layers and the strip sheet 7 located below the fiber bundles 5, 5. The weld-joining sections J1, J2, J2 . . . are formed, for example, by ultrasonic welding.

Figure 3:
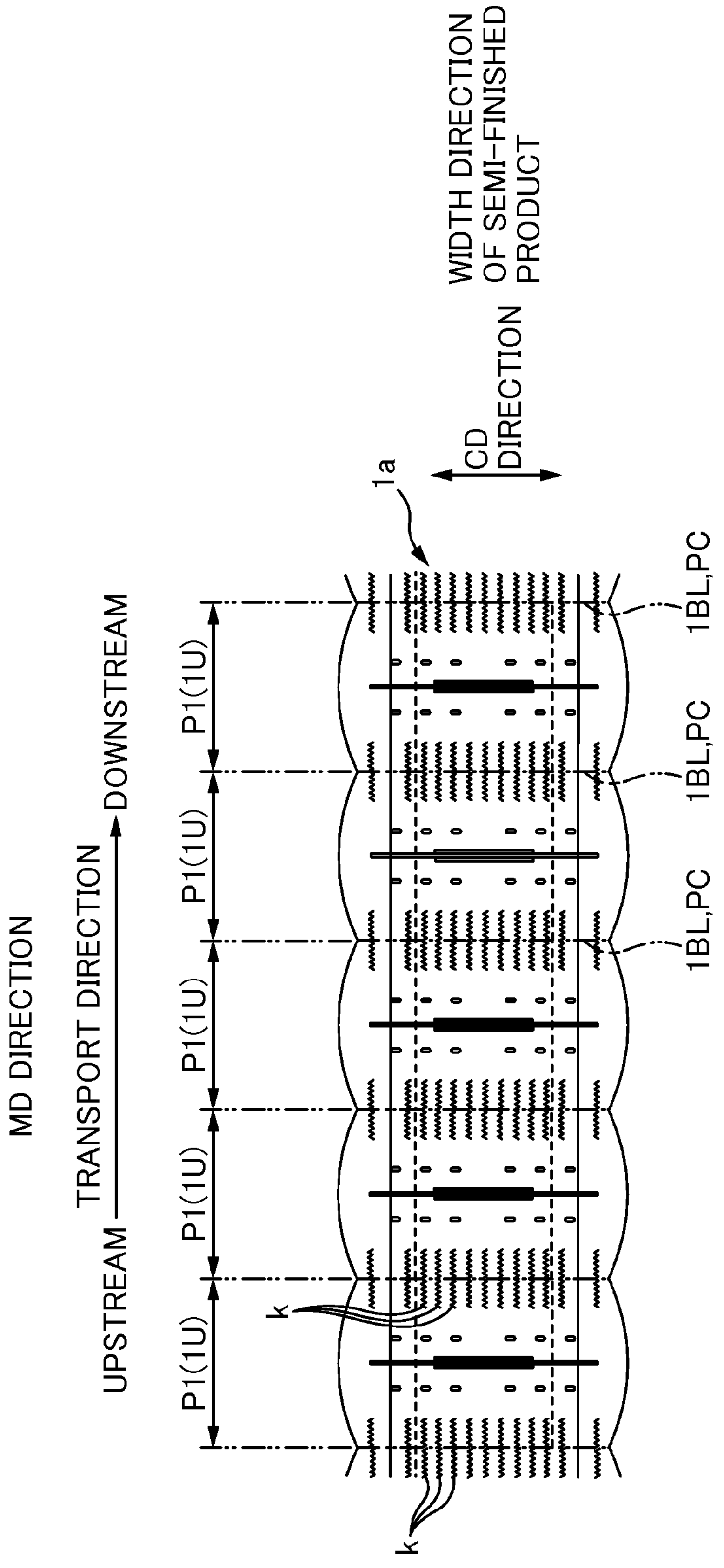
FIG. 3 is a schematic view of a semi-finished product 1*a*, which corresponds to the cleaning web members 1 before cutting.

The cleaning web member 1 is manufactured by being cut into a product size using the cutting apparatus 20 that is installed for substantially the final processing in the production line. FIG. 3 is a schematic view showing a state before cutting. At this stage, all constituent components 3, 2, 5, 5, 5, 5 and 7 of the cleaning web member 1 such as the base sheet 2 and the fiber bundles 5 have already been layered and weld-joined into one piece, but they have not been divided into individual cleaning web members 1, that is, they are in the form of a continuous body 1*a* in which portions 1U, 1U . . . that correspond to the cleaning web members 1, 1 . . . along the transport direction in the production line are continuously arranged in the transport direction at a product width pitch P1. More specifically, the auxiliary sheet 3, the base sheet 2, and the strip sheet 7 are each in the form of a continuous sheet that is continuous in the transport direction. Furthermore, the fiber bundles 5, 5 . . . are also each in the form of a continuous body that is continuous in the transport direction. Hereinafter, the continuous body 1*a* according to the cleaning web member 1 is referred to as a “semi-finished product 1*a*”, and the portions 1U corresponding to the cleaning web members 1 in the semi-finished product 1*a* are each referred to as a “semi-finished product unit 1U”. Note that the semi-finished product 1*a* corresponds to a “continuous web” in the claims.

Furthermore, in this example, the semi-finished product 1*a* is transported in a so-called "transverse-flow" transport state. That is to say, the semi-finished product 1*a* is transported in a state in which the direction corresponding to the width direction of the cleaning web member 1 in the form of the cut sheet product 1 is oriented in the transport direction. Furthermore, the semi-finished product 1*a* is cut with the boundary position 1BL between the semi-finished product units 1U, 1U that are adjacent to each other in the transport direction matching the cut target position PC, and thereby, the cleaning web members 1 in the form of cut sheet products 1 are formed. As clearly described above, the fiber direction of the tows in the fiber bundles 5, 5 . . . in the semi-finished product 1*a* is along the transport direction, and thus, the tows are also cut during the cutting.

Hereinafter, the cutting apparatus 20 that performs the cutting will be described. In the description below, the transport direction of the semi-finished product 1*a* is also referred to as the "MD direction" or the "front-rear direction" and among two directions orthogonal to the transport direction, the width direction of the semi-finished product 1*a* is also referred to as the CD direction. Furthermore, in this example, the MD direction and the CD direction are both along the horizontal plane, and thus, the thickness direction of the semi-finished product 1*a* is in the up-down direction, which is the vertical direction.

Figure 4C:
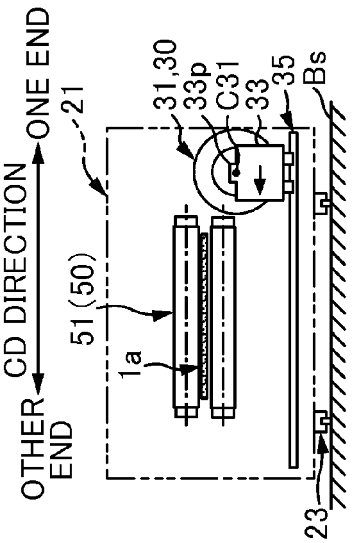
FIG. 4C is a view seen in the direction of arrows C-C in FIG. 4A.
Figure 4A:
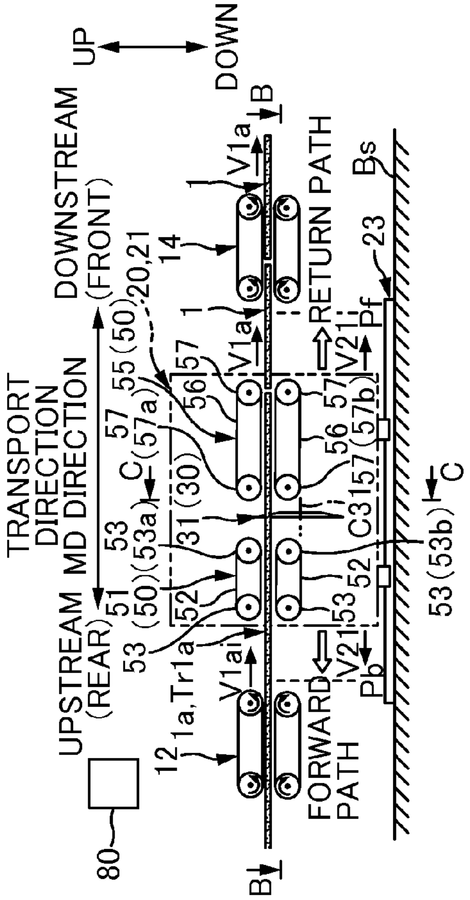
FIG. 4A is a schematic side view of a cutting apparatus 20 of a first embodiment.
Figure 4B:
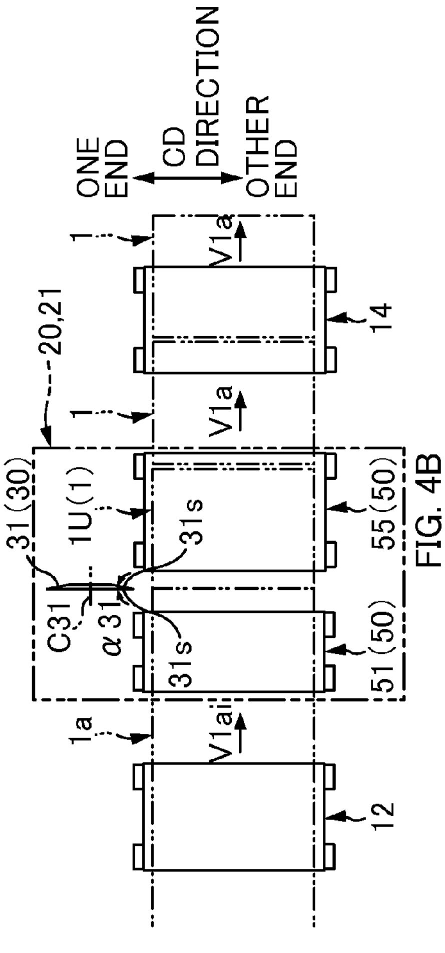
FIG. 4B is a view seen in the direction of arrows B-B in FIG. 4A.

FIG. 4A is a schematic side view of the cutting apparatus 20 of the first embodiment, FIG. 4B is a view seen in the direction of arrows B-B in FIG. 4A, and FIG. 4C is a view seen in the direction of arrows C-C in FIG. 4A. Furthermore, FIGS. 5A to 5I are schematic side views showing a manner in which the cutting apparatus 20 cuts the semi-finished product 1*a* to form the cut sheet products 1. Note that, in these and other drawings used for illustration below, portions in the configuration may be omitted for the sake of simplicity. Furthermore, hatching, which is to be shown on the cross-section faces may be omitted for the same purpose.

A transport device 12 such as a belt conveyor is provided at a position upstream in the MD direction of the cutting apparatus 20, and a transport device 14 such as a belt conveyor is also provided at a position downstream thereof. The semi-finished product 1*a* that has been fed from the upstream transport device 12 to the cutting apparatus 20 at a predetermined entry-side transport velocity value V1*ai* is transported along a transport track Tr1*a* (corresponding to a predetermined track) set in a straight line along the MD direction at a transport velocity value V1*a* that is equal to the aforementioned entry-side transport velocity value V1*ai*, and during this transport, the semi-finished product 1*a* is cut by the cutting apparatus 20 into the cut sheet products 1. The cut sheet products 1 formed by cutting are fed out to the downstream side transport device 14 at the transport velocity value V1*a* that is equal to the aforementioned entry-side transport velocity value V1*ai*. That is to say, the cutting apparatus 20 can cut the semi-finished product 1*a* while maintaining the transport velocity value V1*a* that is equal to the aforementioned entry-side transport velocity value V1*ai* without stopping the transport of the semi-finished product 1*a* and the cut sheet products 1, and thus, productivity can be improved.

Here, a controller (not shown) that controls the upstream and downstream side transport devices 12 and 14 receives synchronizing signals in order to synchronize these transport devices with other devices in the production line, and performs the transport operation of the semi-finished product 1*a* based on the synchronizing signals. Such a synchronizing signal is output, for example, from a rotation detection sensor such as a rotary encoder that measures a transport amount of the semi-finished product 1*a* in a device used as a reference in the production line. The synchronizing signal is, for example, a rotational angle signal in which a rotational angle value of 0 to 360° is allocated in proportion to a transport amount, taking a transport amount corresponding to one semi-finished product unit 1U (i.e., the product width pitch P1) as a transport amount unit. That is to say, a rotational angle value of 0 to 360° is output when transport is performed for one semi-finished product unit 1U, and the output of a rotational angle value of 0 to 360° is periodically repeated every time the transport is performed for one semi-finished product unit. However, the synchronizing signal is not limited to this rotational angle signal. For example, a digital signal in which a digital value of 0 to 8191 allocated in proportion to a transport amount with respect to the above-described transport amount unit may be used as the synchronizing signal, or alternatively, a pulse signal having pulses of a number proportional to the transport amount may be used as the synchronizing signal, where the number of pulses in the signal is counted to detect the rotational angle.

Figures 5A, 5B, 5C, 5D, 5E, 5F, 5G, 5H, 5I:
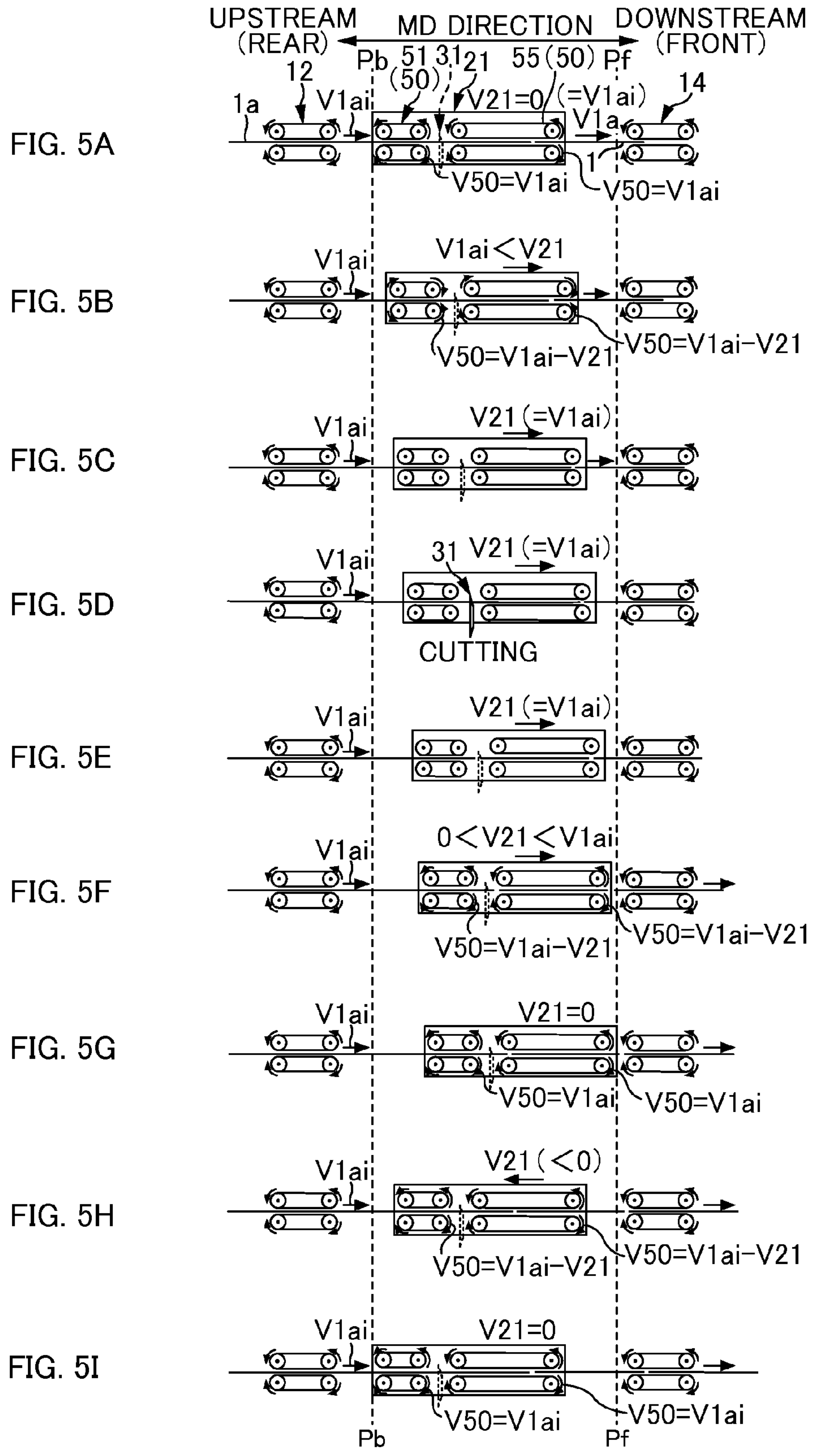
FIGS. 5A to 5I are schematic views showing a manner in which the cutting apparatus 20 cuts the semi-finished product 1*a* to form the cleaning web members 1 in cut sheets.

As shown in FIG. 4A, the cutting apparatus 20 has a reciprocating unit 21 that reciprocates along the aforementioned transport track Tr1*a* between a forward limit Pf located downstream in the MD direction and a backward limit Pb located upstream in the MD direction. The reciprocating unit 21 reciprocates along a forward path from the backward limit Pb to the forward limit Pf (FIGS. 5A to 5G) and along a return path from the forward limit Pf to the backward limit Pb (FIGS. 5G and 5I).

Furthermore, as shown in FIG. 4A, the reciprocating unit 21 has mounted thereto a cutting mechanism 30 that cuts the semi-finished product 1*a* using a rotatable blade 31 and a regulating section 50 that regulates relative movement of the semi-finished product 1*a* in the MD direction with respect to the rotatable blade 31 throughout the time during which the rotatable blade 31 is cutting the semi-finished product 1*a*, and the cutting mechanism 30 and the regulating section 50 together with the reciprocating unit 21 reciprocate along the MD direction (FIGS. 5A to 5I).

Furthermore, in a region corresponding to part of the forward path, an equal velocity region Re is set in which the reciprocating unit 21 moves at a movement velocity value V21 that is equal to the transport velocity value V1*a* of the semi-finished product 1*a*. During movement in the equal velocity region Re, the rotatable blade 31 moves in the CD direction (corresponding to an intersecting direction), and cuts the semi-finished product 1*a* (FIGS. 5C to 5E).

Accordingly, the cutting apparatus 20 can cut the semi-finished product 1*a* while maintaining the aforementioned transport velocity value V1*a* without stopping the transport of the semi-finished product 1*a*. Furthermore, since the regulating section 50 regulates relative movement of the semi-finished product 1*a* in the MD direction and the up-down direction with respect to the rotatable blade 31 throughout the time during which the rotatable blade 31 is performing cutting, disordered movement of the semi-finished product 1*a* that is being cut is effectively prevented, and thus, a good cutting performance can be achieved.

Note that, when the aforementioned cutting ends and the reciprocating unit 21 moves out of the equal velocity region Re and reaches the forward limit Pf (FIGS. 5F and 5G), this unit 21 reverses the movement direction and performs a moving operation along the return path (FIG. 5H). Then, upon reaching the backward limit Pb in the return path (FIG. 5I), the unit 21 reverses the movement direction again, and starts a moving operation along the forward path (FIG. 5A). In the forward path, the above-described cutting operation is performed again (FIGS. 5A to 5G). By repeating this processing, the semi-finished product unit 1U at the downstream end of the semi-finished product 1*a* is sequentially separated by cutting to form the cut sheet products 1.

Hereinafter, the constituent components 21, 30, and 50 of the cutting apparatus 20, and a controller 80 that controls the constituent components 21, 30, and 50 will be described in detail.

<<<Reciprocating Unit 21>>>

As shown in FIG. 4A, the reciprocating unit 21 is reciprocated by an MD direction reciprocating mechanism (corresponding to a reciprocating mechanism) between the forward limit Pf and the backward limit Pb in the MD direction. The MD direction reciprocating mechanism has a guide member 23 that is installed on a base section Bs such as a floor in the production line and a servomotor (not shown) that functions as a driving source. The guide member 23 is, for example, a linear guide 23, and guides the reciprocating unit 21 so as to be capable of reciprocating along the MD direction, which is parallel to the aforementioned transport track Tr1*a*. Furthermore, rotational motion of the servomotor is converted via an appropriate motion converting mechanism such as a feed screw mechanism into linear motion in the MD direction and transmitted to the reciprocating unit 21. Accordingly, when the servomotor is rotated forward, the reciprocating unit 21 is moved along the forward path, and, when the servomotor is rotated in reverse, the reciprocating unit 21 is moved along the return path.

Note that the servomotor performs positional control based on a position command signal (control signal) that is transmitted from the outside. That is to say, this servomotor has an amplifier (not shown) provided with a position detecting component that can detect the actual position. Accordingly, when any position between the forward limit Pf and the backward limit Pb is given as a target position, the servomotor can move the reciprocating unit 21 to the target position in the MD direction based on a feedback signal and the like of the actual position from the position detecting component of the amplifier. The data indicating the target position is transmitted in the form of a position command signal from the controller 80 to the servomotor, and the servomotor operates based on this position command signal.

<<<Cutting Mechanism 30>>>

As shown in FIG. 4A, the cutting mechanism 30 is disposed substantially at the center in the MD direction of the reciprocating unit 21. Furthermore, as shown in FIG. 4C, the cutting mechanism. 30 has a rotatable blade 31, a support platform 33 that supports the rotatable blade 31 in a rotatable manner, and a CD direction reciprocating mechanism that reciprocates the support platform 33 in the CD direction.

The rotatable blade 31 has a main body configured by a disc-like plate in a shape of a perfect circle, and a sharp cutting edge is formed through the entire outer circumferential edge portion thereof. The rotatable blade 31 is integrally provided with a rotating shaft C31 that is coaxial with a center of the circular rotatable blade 31 and that is along the MD direction, and the rotating shaft C31 is supported by a bearing (not shown) or the like on the aforementioned support platform 33.

The support platform. 33 is provided with a motor (not shown) as a driving source that drives to rotate the rotatable blade 31 about the axis of the rotating shaft C31. Accordingly, a rotational force of the motor is transmitted to the rotatable blade 31 by an appropriate power transmission mechanism (not shown) such as a wrapping transmission device, and thus, the rotatable blade 31 is continuously driven to rotate in one direction at a predetermined circumferential velocity.

Meanwhile, as shown in FIG. 4C, the CD direction reciprocating mechanism has a guide member 35 that guides the support platform 33 of the rotatable blade 31 so as to be capable of reciprocating in the CD direction, and a drive mechanism (not shown) that reciprocates the support platform 33 in the CD direction. The guide member 35 is, for example, a linear guide 35. Furthermore, the drive mechanism has a servomotor that functions as a driving source, and an appropriate motion converting mechanism that converts rotational motion of the servomotor into linear motion in the CD direction and transmits it to the support platform 33.

When the servomotor is rotated forward, the rotatable blade 31 is moved via the support platform 33 from one end to the other end along the CD direction, and, when the servomotor is rotated backward, the rotatable blade 31 is moved from the other end to the one end. Note that the servomotor operates based on an operation command signal that gives a command for a forward or a reverse rotational motion. For example, when the operation command signal is ON, a rotational motion takes place, and, when this command is OFF, the motion is stopped. This operation command signal is transmitted from the controller 80 to the servomotor.

Each stroke distance in the forward path and the return path according to the reciprocation in the CD direction is set to a distance that allows the rotatable blade 31 to run cross the semi-finished product 1*a* in the CD direction along the entire width. Accordingly, the rotatable blade 31 that is being driven to rotate about the rotating shaft C31 moves from the one end to the other end in the CD direction, or, alternatively, moves from the other end to the one end in the CD direction, and thereby, the cutting edge of the rotatable blade 31 cuts the semi-finished product 1*a*.

<<<Regulating Section 50>>>

As described above, the regulating section 50 shown in FIG. 4A regulates relative movement of the semi-finished product 1*a* in the MD direction and the up-down direction with respect to the rotatable blade 31 throughout the time during which the rotatable blade 31 is cutting the semi-finished product 1*a*. Furthermore, the regulating section 50 has an upstream side regulating mechanism 51 and a downstream side regulating mechanism 55. The upstream side regulating mechanism 51 is disposed at a position on the upstream side in the MD direction of the installation position of the rotatable blade 31, and regulates relative movement of the semi-finished product 1*a* at the upstream side position. The downstream side regulating mechanism 55 is disposed at a position on the downstream side of the installation position of the rotatable blade 31, and regulates relative movement of the semi-finished product 1*a* at the downstream side position.

Note that the regulating mechanisms 51 and 55 have, in addition to the aforementioned function of regulating relative movement of the semi-finished product 1*a*, a function of transporting the semi-finished product 1*a* in the MD direction in the reciprocating unit 21. The reason for this is that, since the semi-finished product 1*a* is cut to form the cut sheet products 1 in the reciprocating unit 21, transport of the semi-finished product 1*a* and the cut sheet products 1 inside the reciprocating unit 21 cannot be performed by the aforementioned external transport devices 12 and 14. That is to say, an internal transport mechanism of its own for transporting the semi-finished product 1*a* and the cut sheet products 1 is necessary inside the reciprocating unit 21, and the upstream side regulating mechanism 51 and the downstream side regulating mechanism 55 function also as this transport mechanism.

Accordingly, the regulating mechanisms 51 and 55 are each configured by a belt conveyor. That is to say, as shown in FIG. 4A, the upstream side regulating mechanism 51 and the downstream side regulating mechanism. 55 each have a pair of upper and lower endless belts 52, 52 (56, 56) that are arranged such that the outer circumferential faces oppose each other. The transport track Tr1*a* of the aforementioned semi-finished product 1*a* is set between the endless belts 52, 52 (56, 56), and the semi-finished product 1*a* is gently pressed between the outer circumferential faces of the endless belts 52, 52 (56, 56) in the thickness direction. Furthermore, each of the endless belts 52, 52 (56, 56) is wound around a pair of rollers 53, 53 (57, 57) that are arranged in line, one in front of the other, in the MD direction. At least one of the pair of rollers 53, 53 (57, 57) is driven to rotate by a servomotor (not shown) that functions as a driving source, and thus, when the endless belts 52, 52 (56, 56) are driven to circumferentially revolve, the semi-finished product 1*a* can be fed in the MD direction.

If the regulating section 50 including the regulating mechanisms 51 and 55 has such a transport function, even when the reciprocating unit 21 reciprocates in the MD direction, regardless of the reciprocating movement, the transport velocity value V1*a* in the absolute coordinate system of the semi-finished product 1*a* that is transported in the reciprocating unit 21 can be kept equal to the aforementioned entry side transport velocity value V1*ai*, that is, the transport velocity value V1*ai* of the semi-finished product 1*a* immediately upstream in the MD direction of the cutting apparatus 20. This aspect will be described in detail below.

First, when the velocity value in the reciprocating movement of the reciprocating unit 21 is referred to as the "movement velocity value V21", and the relative velocity value at which the regulating section 50 (the upstream side regulating mechanism 51 and the downstream side regulating mechanism 55) relatively feeds the semi-finished product 1*a* in the MD direction is referred to as the "relative feeding velocity value V50", the transport velocity value V1*a* of the semi-finished product 1*a* in the absolute coordinate system is the velocity value obtained by adding the movement velocity value V21 of the reciprocating unit 21 and the relative feeding velocity value V20.

Accordingly, when the relative feeding velocity value V50 is sequentially adjusted according to the movement velocity value V21 so as to match a target relative feeding velocity value V50*m* determined using Formula 1 below, the semi-finished product 1*a* and the cut sheet products 1 in the reciprocating unit 21 can be transported while the transport velocity value V1*a* in the absolute coordinate system of the semi-finished product 1*a* and the cut sheet products 1 in the reciprocating unit 21 are maintained at the entry side transport velocity value V1*ai*.

$$V50m(\mathrm{m/min})=V1ai(\mathrm{m/min})-V21(\mathrm{m/min}) \quad (1)$$

Note that the movement velocity value V21 of the reciprocating unit 21 in Formula 1 above is set such that the velocity value V21 takes a positive value when the unit 21 is moving to the downstream side in the MD direction and the velocity value V21 takes a negative value when moving to the upstream side. When the target relative feeding velocity value V50*m* takes a positive value, the semi-finished product 1*a* is fed relatively to the downstream side in the MD direction with respect to the reciprocating unit 21 (the regulating section 50), and, when this value takes a negative value, the semi-finished product 1*a* is fed relatively to the upstream side in the MD direction. Note that the actual value of the movement velocity value V21 is measured in real-time using a detector such as an encoder, and is sequentially transmitted to the controller 80. The controller 80 calculates using Formula 1 above, and controls the aforementioned relative feeding velocity value V50.

Incidentally, as shown in FIGS. 5C to 5E, when the reciprocating unit 21 enters the equal velocity region Re in the forward path, the reciprocating unit 21 moves in the equal velocity region Re at a movement velocity value V21 that is equal to the entry side transport velocity value V1*ai* of the semi-finished product 1*a*. Accordingly, as is clear from Formula 1 above, in the equal velocity region Re, the relative feeding velocity value V50 of the upstream side regulating mechanism 51 and the downstream side regulating mechanism 55 is zero (=V1*ai*−V1*ai*), and the drive to circumferentially revolve the endless belts 52, 52 and 56, 56 of the regulating mechanisms 51 and 55 is stopped. On the relative coordinate system of the reciprocating unit 21, the movement of the semi-finished product 1*a* is apparently in a stopped state. That is to say, in the equal velocity region Re, the semi-finished product 1*a* is not being relatively moved in the MD direction with respect to the rotatable blade 31, in other words, the upstream side regulating mechanism 51 and the downstream side regulating mechanism 55 are regulating relative movement of the semi-finished product 1*a* not only in the up-down direction but also in the MD direction with respect to the rotatable blade 31. Accordingly, disordered movement of the semi-finished product 1*a* that is being cut is effectively prevented, and a high cutting performance of the rotatable blade 31 can be achieved.

Here, as shown in FIGS. 5F and 5G, when the reciprocating unit 21 exits from the equal velocity region Re in the forward path, the movement velocity value V21 becomes a value that is different from the entry side transport velocity value V1*ai*. Thus as can be seen from Formula 1 above, the relative feeding velocity value V50 of the upstream side regulating mechanism 51 and the downstream side regulating mechanism 55 is no longer zero. Thus, the semi-finished product 1*a* is relatively moved in the MD direction with respect to the rotatable blade 31. That is to say, at substantially the same time when the reciprocating unit 21 exits from the equal velocity region Re, the regulation of relative movement of the semi-finished product 1*a* in the MD direction by the upstream side regulating mechanism 51 and the downstream side regulating mechanism 55 is canceled.

<<<Controller 80>>>

The controller 80 is an appropriate computer or sequencer, and has a processor and a memory (not shown). The above-described synchronizing signal is input to the controller 80. Based on this synchronizing signal, the controller 80 controls the MD direction reciprocating mechanism for the reciprocating unit 21, the CD direction reciprocating mechanism for the cutting mechanism 30, the regulating section 50, and the like.

For example, the above-described position command signal is transmitted as a control signal to the amplifier of the servomotor of the MD direction reciprocating mechanism for the reciprocating unit 21, while the above-described operation command signal is transmitted as a control signal to the servomotor of the CD direction reciprocating mechanism for the cutting mechanism 30, and a velocity command signal indicating the target relative feeding velocity value V50*m* is transmitted as a control signal to each servomotor of the upstream side regulating mechanism 51 and the downstream side regulating mechanism 55 of the regulating section 50.

Here, the memory of the controller 80 has stored in advance a control program relating to the aforementioned control. For example, the memory has stored an arithmetic program for calculating the target relative feeding velocity value V50*m* of the regulating section 50 based on Formula 1 above, and also has stored in advance data indicating an operation pattern for prescribing the reciprocal moving operation of the reciprocating unit 21 in the MD direction and data prescribing the ON/OFF state of the operation command signal for the CD direction reciprocating mechanism for the cutting mechanism 30. And the processor reads and executes the corresponding control program or data stored in the memory as needed, to control the aforementioned MD direction reciprocating mechanism, the CD direction reciprocating mechanism, and the upstream side regulating mechanism 51 and the downstream side regulating mechanism 55.

Figure 6:
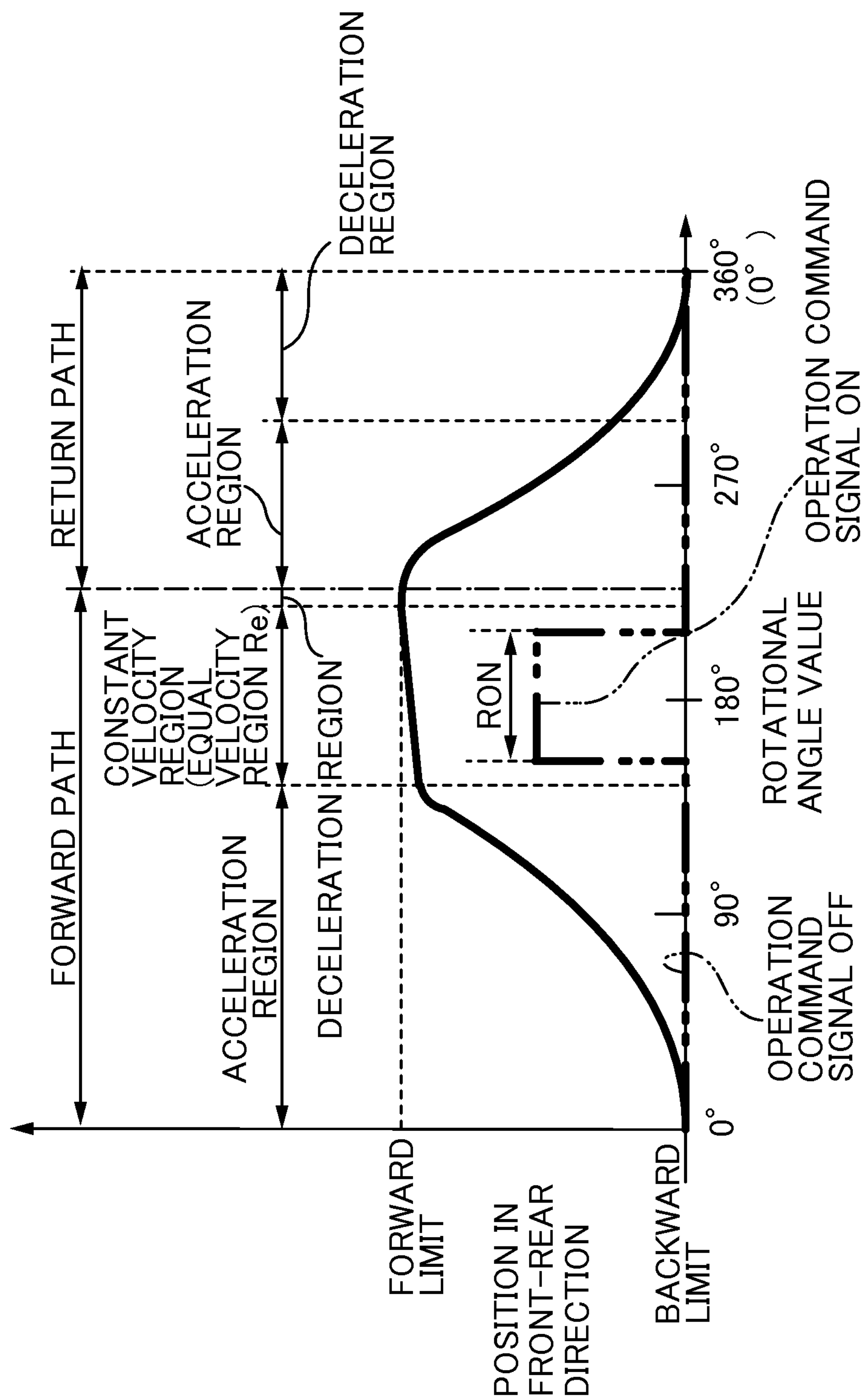
FIG. 6 is an explanatory graph of data indicating an operation pattern of a reciprocating operation of a reciprocating unit 21 in the MD direction.

FIG. 6 is an explanatory graph of data indicating an operation pattern of a reciprocating operation of the reciprocating unit 21, in the MD direction (pattern indicating a relationship between a target position of the reciprocating unit 21 in the MD direction and a rotational angle value of the synchronizing signal). In the graph, the vertical axis indicates the target position in the MD direction, and the horizontal axis indicates the rotational angle value corresponding to the synchronizing signal, that is, a value of 0 to 360° to which a unit transport amount that is a transport amount for one semi-finished product unit 1U (one product width pitch P1) is allocated. Note that 360° and 0° refer to the same state. Furthermore, since the above-described data relating to the operation command signal for the CD direction reciprocating mechanism prescribes the ON/OFF state of the operation command signal in association with the rotational angle value, FIG. 6 also shows ON/OFF state of the operation command signal.

The controller 80 acquires a target position corresponding to the rotational angle value of the synchronizing signal, at a predetermined control cycle, from the data within the memory indicating an operation pattern, and transmits data of the acquired target position as a position command signal to the servomotor of the MD direction reciprocating mechanism. Then, the servomotor operates such that the reciprocating unit 21 is moved to the target position indicated by this position command signal, and thereby, the reciprocating unit 21 reciprocates in the operation pattern shown in FIG. 6.

Here, as shown in FIG. 6, for example, an acceleration region in which the velocity is mainly accelerated, a constant velocity region in which the movement velocity is constant at a movement velocity value V21, and a deceleration region in which the velocity is mainly decelerated are set within a range of 0° to 225°, which is the range of the rotational angle value corresponding to the forward path. Whereas an acceleration region in which the velocity is mainly accelerated and a deceleration region in which the velocity is mainly decelerated are set in a range of 225° to 360°, which is the range of the rotational angle value corresponding to the return path. Furthermore, the movement velocity value V21 in the constant velocity region in the forward path is set at a velocity value that is equal to the entry side transport velocity value V1*ai* of the semi-finished product 1*a* in the MD direction. That is to say, this constant velocity region is set to the equal velocity region Re in which the rotatable blade 31 and the regulating section 50 mounted in the reciprocating unit 21 move at the movement velocity value V21 that is equal to the entry side transport velocity value V1*ai*, that is, the transport velocity value V1*a* of the semi-finished product 1*a*. Furthermore, the operation command signal for the rotatable blade 31 is at an ON state in the RON range of the predetermined rotational angle value corresponding to substantially the center region in the equal velocity region Re.

Accordingly, when the rotational angle value indicated by the synchronizing signal enters the RON range, the controller 80 switches the operation command signal for the CD direction reciprocating mechanism from an OFF state to an ON state. Accordingly, the rotatable blade 31 moves, for example, from the one end to the other end in the CD direction, and cuts the semi-finished product 1*a*. Then, when the rotational angle value of the synchronizing signal exits from the RON range, the controller 80 switches the operation command signal to an OFF state, and thus, the movement of the rotatable blade 31 in the CD direction is stopped, and is put on standby on the other end until the operation command signal is switched again from an OFF state to an ON state. Note that the rotational direction of the servomotor indicated by the operation command signal is reversed to its immediately previous rotational direction, for example, every time the operation command signal is switched to an ON state. Accordingly, when the operation command signal is switched to an ON state again, the rotatable blade 31 moves from the other end to the one end in the CD direction, and cuts the semi-finished product 1*a*. Subsequently, by repeating this processing, the cut sheet products 1 are formed from the semi-finished product 1*a* in the bidirectional cutting operation.

As can be seen from FIG. 6, the RON range of the rotational angle values having corresponded thereto the movement of the rotatable blade 31 in the CD direction set at an ON state is completely included in the equal velocity region Re in the forward path. Accordingly, the rotatable blade 31 cuts the semi-finished product 1*a* in state in which the movement velocity value V21 of the reciprocating unit 21 in the MD direction is exactly equal to the transport velocity value V1*a* of the semi-finished product 1*a*. That is to say, the rotatable blade 31 cuts the semi-finished product 1*a* while moving in the MD direction at the movement velocity value V21 that is equal to the transport velocity value V1*a* of the semi-finished product 1*a*. Accordingly, at the time of cutting the semi-finished product 1*a*, the transport of the semi-finished product 1*a* does not have to be stopped.

Furthermore, as described above, in the equal velocity region Re, the relative feeding velocity value V50 of the semi-finished product 1*a* at the regulating section 50 is zero, and thus, the semi-finished product 1*a* is not allowed to relatively move in the MD direction with respect to the rotatable blade 31. That is to say, the relative movement of the semi-finished product 1*a* in the MD direction with respect to the rotatable blade 31 is regulated by the regulating section 50. Since the rotatable blade 31 cuts the semi-finished product 1*a* whose relative movement is being regulated, disordered movement of the semi-finished product 1*a* that is being cut is effectively prevented, and thus, a good cutting performance can be achieved.

Here, the operation pattern of the reciprocating operation of the reciprocating unit 21 is not limited to the example in FIG. 6, and may be modified appropriately as necessary.

Figure 7A:
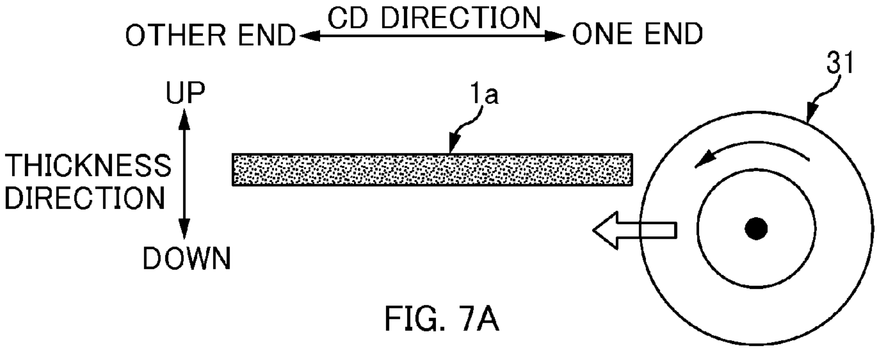
FIGS. 7A to 7C are explanatory views showing a process that increases the volume of fiber bundles 5 using a rotatable blade 31 accompanied by a cutting operation by the rotatable blade 31.
Figure 7B:
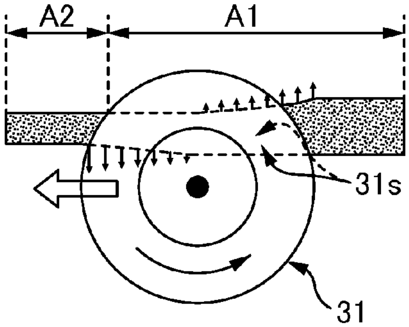
Figure 7C:
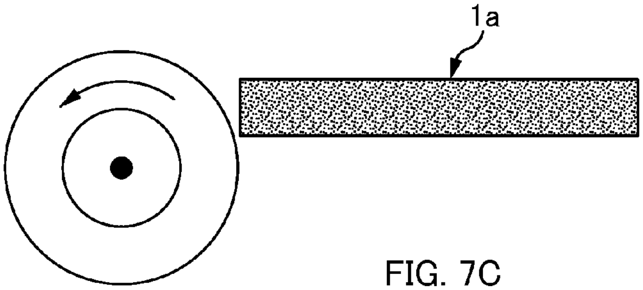
Figure 7D:
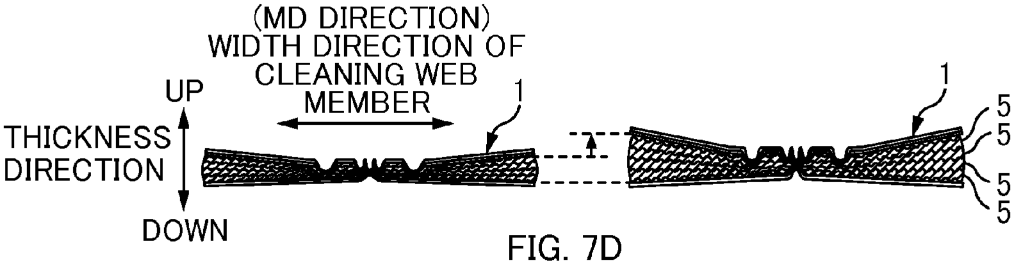
FIG. 7D shows schematic side views of the cleaning web member 1 showing a change in the volume caused by the rotatable blade 31.

Incidentally, when this sort of rotatable blade 31 is used, the fiber bundles 5 can be made voluminous immediately after cutting. FIGS. 7A to 7C are explanatory views showing a process the voluminous fiber bundles 5 of tows using the rotatable blade 31 accompanied by the cutting operation by the rotatable blade 31, showing a manner in which the rotatable blade 31 moves from the one end to the other end in the CD direction. As shown in FIG. 7B, the semi-finished product 1*a* that is being cut by the rotatable blade 31 includes both an already cut portion A1 through which the cutting edge has passed and an uncut portion A2 through which the cutting edge has not passed yet. In this state, blade faces 31*s*, 31*s* of the rotatable blade 31 are sequentially brought into contact with the already cut portion A1, and due to rotation of the blade faces 31*s*, the tows in the already cut portion A1 are spread and loosened in the thickness direction of the semi-finished product 1*a* as indicated by the short arrows in FIG. 7B. As a result, the fiber bundles 5 of tows are dispersed in the thickness direction, and are made very soft and voluminous. Accordingly, with the cutting apparatus 20, the cut sheet product 1 is fed to the subsequent processing not in a non-voluminous state as shown in the left drawing in FIG. 7D but in a voluminous state as shown in the right drawing in FIG. 7D. Accordingly, any special volume increasing treatment does not have to be additionally performed in the subsequent processing and the like, and thus, the cleaning web member 1 in the form of a voluminous cut sheet product 1 having a high dust trapping performance can be promptly shipped.

Figure 8A:
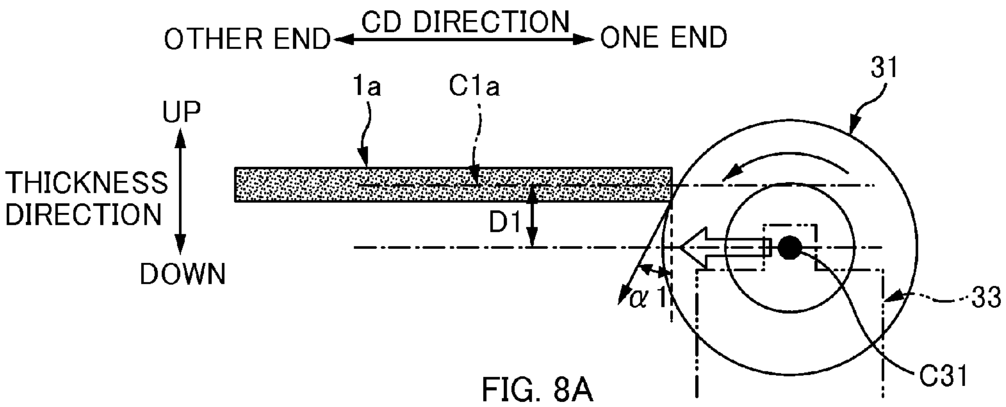
FIG. 8A is a view showing a positional relationship between a rotating shaft C31 of the rotatable blade 31 and a center position C1*a* in the thickness direction of the semi-finished product 1*a* according to the first embodiment.
Figure 8B:
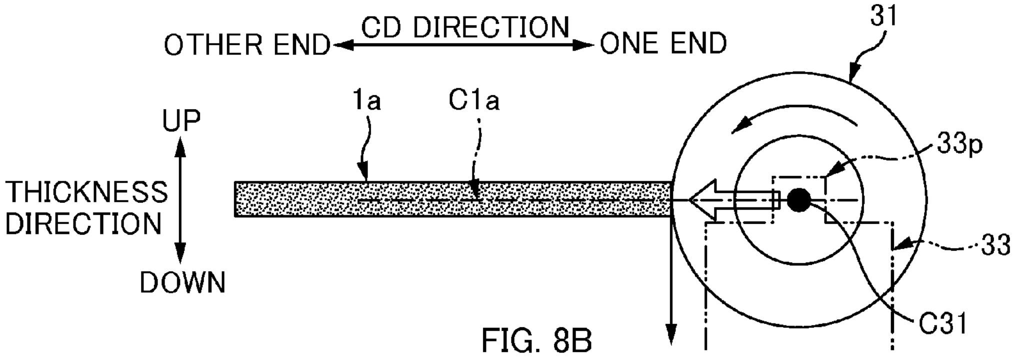
FIGS. 8B and 8C are views showing a positional relationship between the rotating shaft C31 of the rotatable blade 31 and the center position C1*a* in the thickness direction of the semi-finished product 1*a* according to a comparative example.

Furthermore, as shown in FIG. 8A, in the first embodiment, the position of the rotating shaft C31 of the rotatable blade 31 and a center position C1*a* in the thickness direction of the semi-finished product 1*a* are offset from each other in the thickness direction of the semi-finished product 1*a* by a predetermined distance D1. The reason for this is as follows. That is, when the position of the rotating shaft C31 and the center position C1*a* of the semi-finished product 1*a* match each other in the thickness direction as in the comparative example in FIG. 8B, the movement direction of the cutting edge of the rotatable blade 31 at a position where it comes into contact with the semi-finished product 1*a* is parallel to the thickness direction of the semi-finished product 1*a* as shown in FIG. 8B. In this case, a large cut resistance acts on the rotatable blade 31 at the start of cutting, and thus, the cutting performance becomes poor. On the other hand, as shown in FIG. 8A, when the position of the rotating shaft C31 of the rotatable blade 31 and the center position C1*a* in the thickness direction of the semi-finished product 1*a* are offset from each other in the thickness direction of the semi-finished product 1*a* by the predetermined distance D1, the movement direction of the cutting edge at a position where it comes into contact with the semi-finished product 1*a* at the start of cutting forms a predetermined inclination angle $\alpha$1 with respect to the thickness direction of the semi-finished product 1*a*. Accordingly, the cut resistance at the start of cutting can be reduced, and thus, a good cutting performance can be achieved throughout the process from the start to the end of cutting.

Figure 8C:
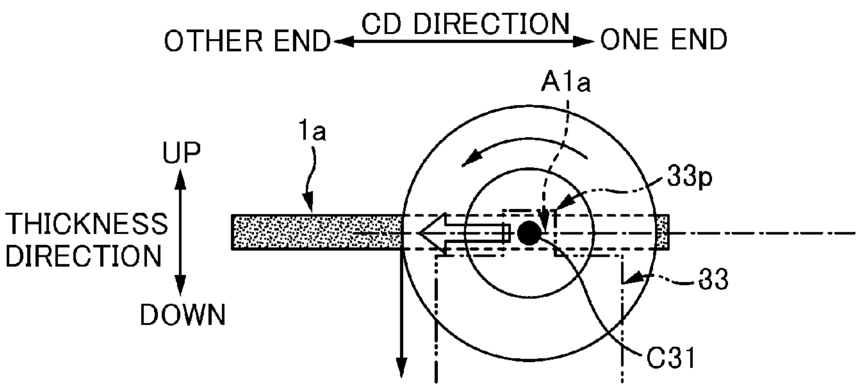

Here, when the positions are offset from each other by the predetermined distance D1 as described above, the following problems are solved as well. That is to say, when the rotating shaft C31 and the center position C1*a* of the semi-finished product 1*a* match each other as in the comparative example in FIG. 8B, the rotating shaft C31 during cutting moves in the CD direction along a cut face A1*a* of the semi-finished product 1*a* as shown in FIG. 8C. However, generally, a part 33*p* of the support platform 33 exists at the position of the rotating shaft C31 in order to support the rotating shaft C31 as shown in FIG. 4C, and, thus, the total thickness in the MD direction including the rotating shaft C31 and the related part 33*p* positioned proximate thereto is considerably larger than the thickness of the rotatable blade 31 alone. Accordingly, when the rotating shaft C31 moves in the CD direction along the cut face A1*a* (FIG. 8C), for example, the part 33*p* and the like are caught on the cut face A1*a*, and the resistance to the movement in the CD direction during cutting may be increased, which makes it difficult for the rotational blade to move at high velocity in the CD direction, lowering the productivity. Furthermore, during the movement in the CD direction, the part 33*p* and the like may hit hard against tows at the cut face A1*a* and damage the tows. On the other hand, when the position of the rotating shaft C31 is offset from the center position C1*a* of the semi-finished product 1*a* in the thickness direction by the predetermined distance D1 as shown in FIG. 8A, the part 33*p* of the support platform 33 positioned proximate the rotating shaft C31 can be positioned away from the cut face A1*a*, and the interference between the part 33*p* and the cut face A1*a* can be avoided, and, thus, the aforementioned problems can be effectively prevented. Note that the size of the predetermined distance D1 is determined in consideration of the size of the part 33*p* such that the part 33*p* does not hit against the semi-finished product 1*a*.

Figure 9:
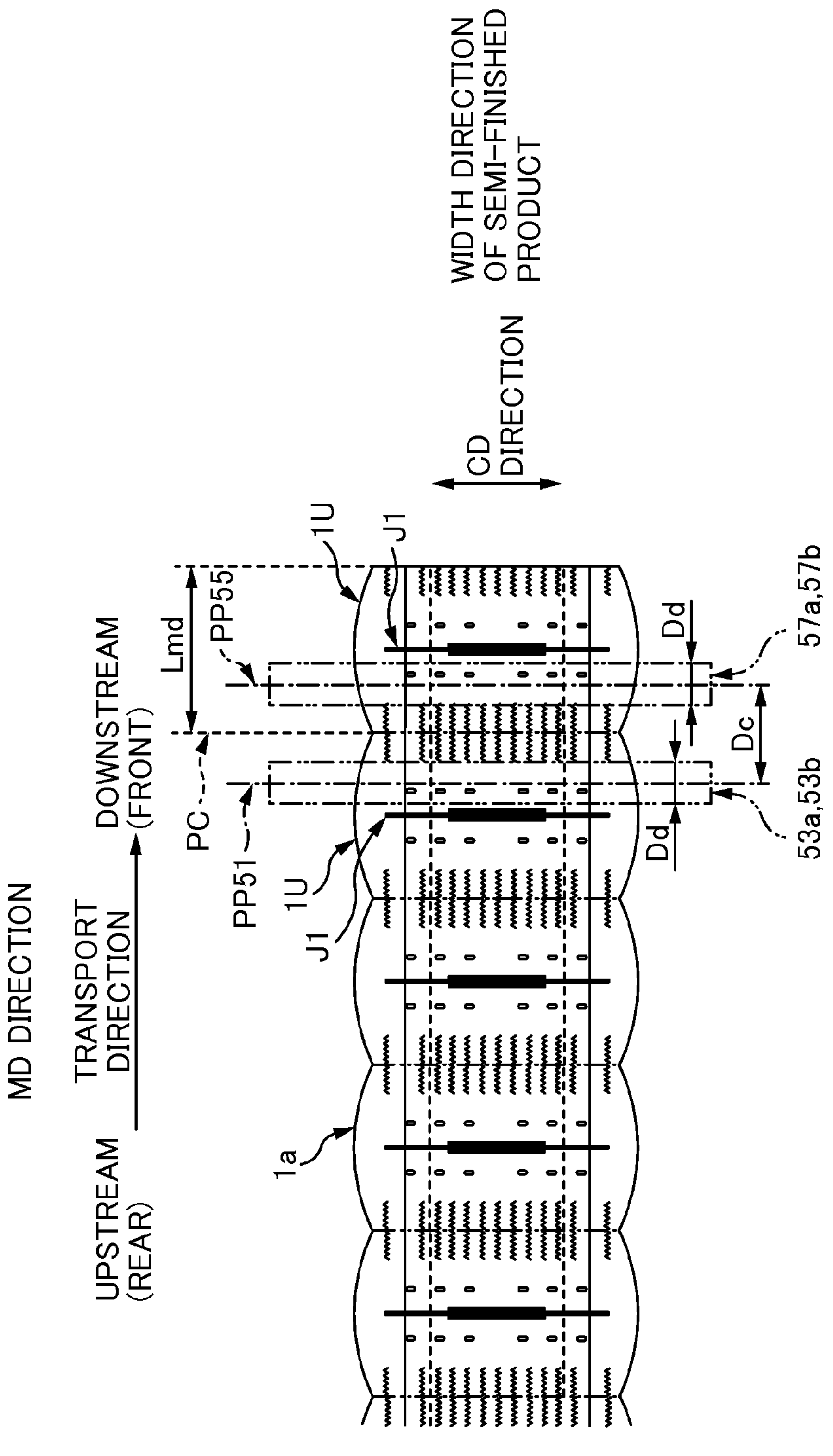
FIG. 9 is a schematic view showing a preferred example of press positions PP51 and PP55 of an upstream regulating mechanism 51 and a downstream regulating mechanism 55 on the semi-finished product 1*a;*

Furthermore, in order to reliably regulate relative movement of the semi-finished product 1*a* that is being cut, with respect to the rotatable blade 31, the upstream side regulating mechanism 51 and the downstream side regulating mechanism 55 may be respectively configured so as to be capable of pressing positions proximate the cut target position PC on the semi-finished product 1*a*. For example, as shown in the schematic view of the semi-finished product 1*a* in FIG. 9, first, a press position PP55 corresponding to the downstream side regulating mechanism 55 may be configured so as to be positioned upstream of the first weld-joining section J1 of the semi-finished product unit 1U that is positioned at the most downstream end of the semi-finished product 1*a*. Furthermore, a press position PP51 corresponding to the upstream side regulating mechanism 51 may be configured so as to be positioned downstream of the first weld-joining section J1 of the semi-finished product unit 1U that is positioned immediately upstream of the above-mentioned semi-finished product unit 1U.

The press positions PP51 and PP55 are set at such positions, for example, as follows. First, a diameter Dd of rollers 53*a*, 53*b*, 57*a*, and 57*b* related to pressing is set to be smaller than a product size Lmd in the MD direction of the cleaning web member 1 (set to be smaller than half the product size Lmd (smaller than Lmd/2) for the purpose of more reliable positional setting), and an inter-axis distance Dc between rollers that are arranged adjacent to each other in the MD direction corresponding to each other among the rollers 53*a*, 53*b*, 57*a*, and 57*b* (the distance Dc between the rotation axes), that is, the inter-axis distance Dc between the rollers 53*a* and 57*a* and the inter-axis distance Dc between the rollers 53*b* and 57*b* may be each set to be smaller than the product size Lmd (set to be smaller than the half the product size Lmd (smaller than Lmd/2) for the purpose of more reliable positional setting) within a range that does not cause interference between the rollers.

Here, "rollers 53*a*, 53*b*, 57*a*, and 57*b* related to pressing" described above refer to the following four rollers 53, 53, 57 and 57: namely the roller 57*a*, is the roller 57 that is positioned on the upstream side, of the pair of rollers 57, 57 for the upper endless belt 56 in the downstream side regulating mechanism 55 in FIG. 4A; the roller 57*b*, is the roller 57 that is positioned on the upstream side, of the pair of rollers 57, 57 for the lower endless belt 56 in the downstream side regulating mechanism 55; the roller 53*a*, is the roller 53 that is positioned on the downstream side, of the pair of rollers 53, 53 for the upper endless belt 52 in the upstream side regulating mechanism 51 in FIG. 4A; and the roller 53*b*, is the roller 53 that is positioned on the downstream side, of the pair of rollers 53, 53 for the lower endless belt 52 in the upstream side regulating mechanism 51.

Figure 10A:
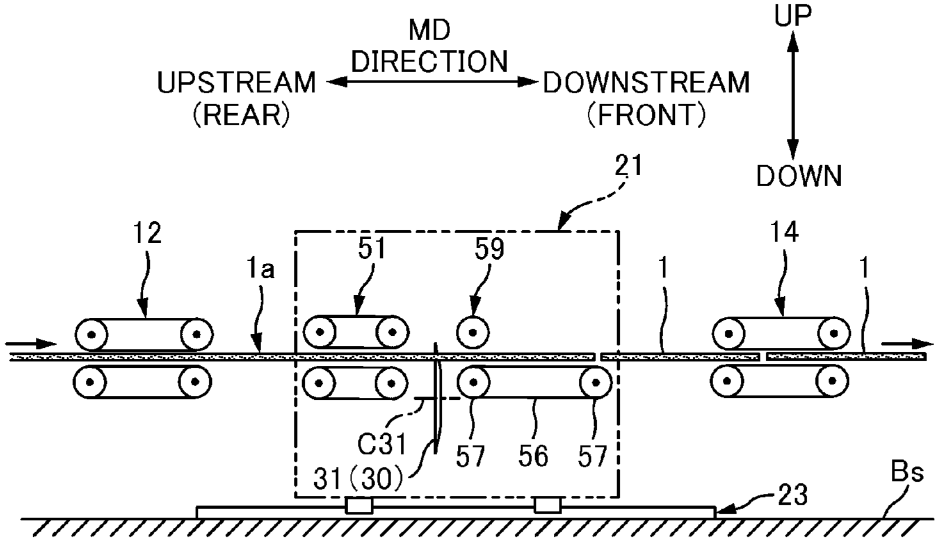
FIGS. 10A and 10B are explanatory views respectively showing modified examples of the first embodiment.
Figure 10B:
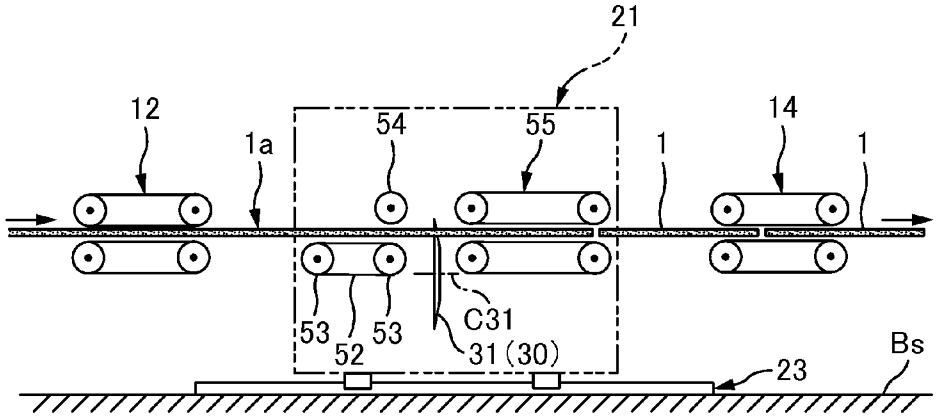

FIGS. 10A and 10B are explanatory views of modified examples of the first embodiment, respectively showing schematic side views. In the description below, different aspects will be mainly described, and the same constituent components are denoted by the same reference numerals and description thereof has been omitted.

A first modified example shown in FIG. 10A is different from the foregoing example in that one roller 59 is provided instead of the upper endless belt 56 of the downstream side regulating mechanism 55. The roller 59 presses while sandwiching the semi-finished product 1*a* in the thickness direction with the lower endless belt 56. Here, it is desirable that the roller 59 is configured so as to be driven to rotate by a driving source such as a servomotor, so that the semi-finished product 1*a* can be smoothly fed in the MD direction in conjunction with the lower endless belt 56 that is being driven to circumferentially revolve. Accordingly, the transport of the semi-finished product 1*a* is effectively prevented from being obstructed.

A second modified example shown in FIG. 10B is different from the foregoing example in that one roller 54 is provided instead of the upper endless belt 52 of the upstream side regulating mechanism 51. The roller 54 presses while sandwiching the semi-finished product 1*a* in the thickness direction with the lower endless belt 52. Also, it is desirable that the roller 54 is configured so as to be driven to rotate by a driving source such as a servomotor, so that the semi-finished product 1*a* can be smoothly fed in the MD direction in conjunction with the lower endless belt 52 that is being driven to circumferentially revolve. Accordingly, the transport of the semi-finished product 1*a* is effectively prevented from being obstructed.

Second Embodiment

Figure 11B:
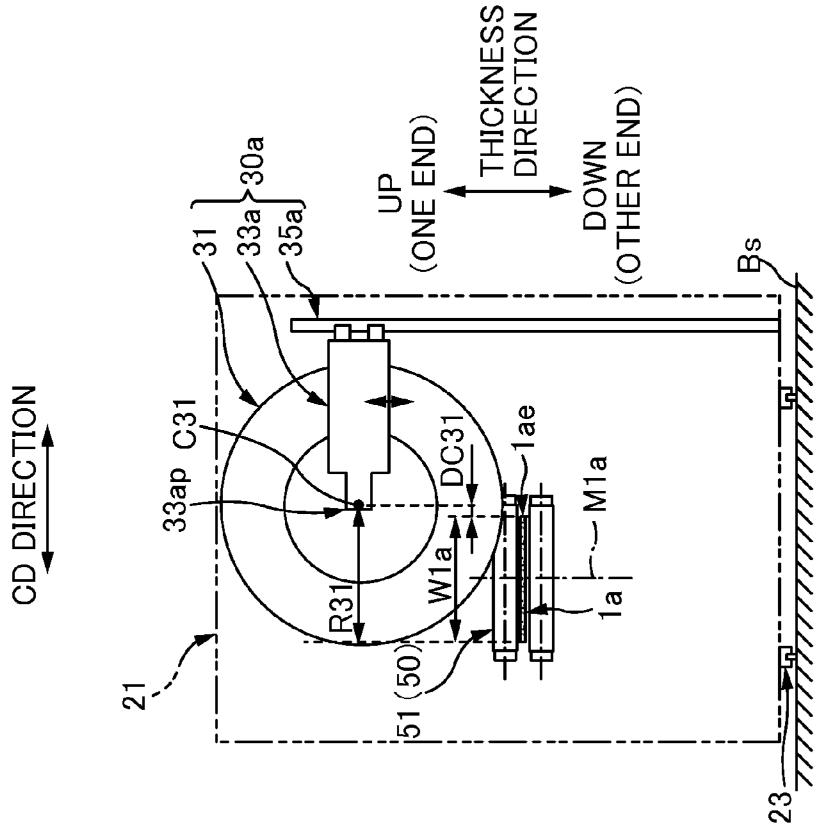
FIG. 11B is a view seen in the direction of arrows B-B in FIG. 11A.
Figure 11A:
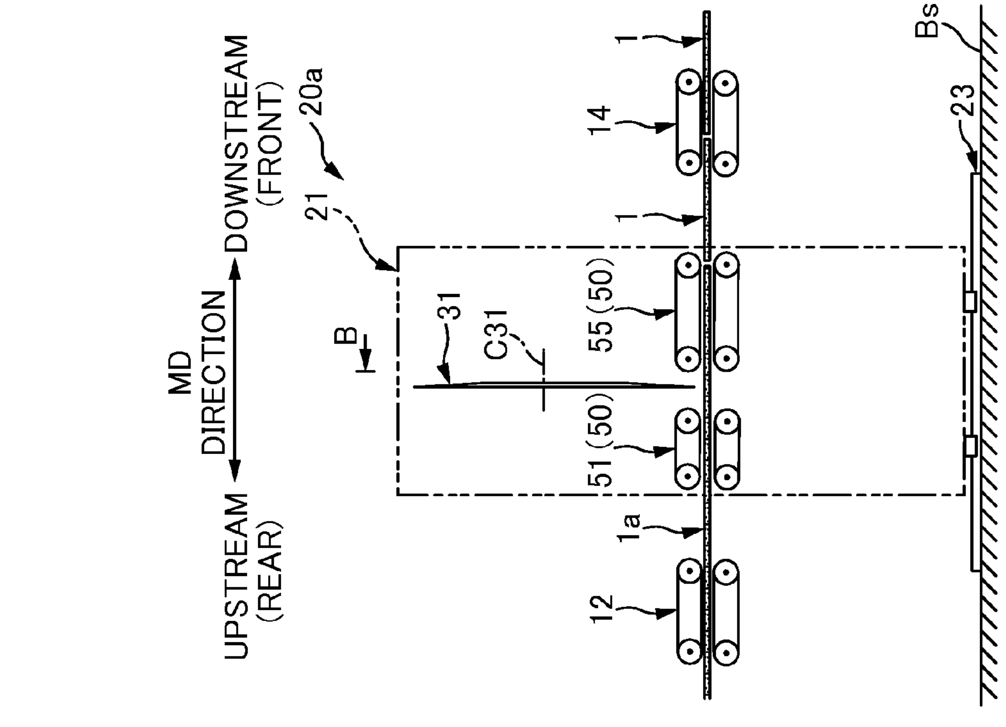
FIG. 11A is a schematic side view of a cutting apparatus 20*a* of a second embodiment.

FIG. 11A is schematic side view of a cutting apparatus 20*a* of the second embodiment, and FIG. 11B is a view seen in the direction of arrows B-B in FIG. 11A.

The cutting apparatus 20*a* of the second embodiment is different from the first embodiment mainly in that the movement direction of the rotatable blade 31 is not along the CD direction but along the thickness direction of the semi-finished product 1*a* (corresponding to the intersecting direction), and those other than the above are substantially similar to those in the first embodiment. Accordingly, in the description below, the same constituent components as those in the first embodiment are denoted by the same reference numerals, and a description thereof is omitted.

In the cutting apparatus 20*a*, during movement of the reciprocating unit 21 in the equal velocity region Re in the forward path, the rotatable blade 31 of the cutting mechanism 30*a* while being driven to rotate about the axis of the rotating shaft C31 moves from the one end to the other end in the thickness direction of the semi-finished product 1*a*, or alternatively, moves from the other end to the one end in the thickness direction. The cutting edge of the rotatable blade 31 that is being driven to rotate cuts the semi-finished product 1*a* during the movement. In the example in FIGS. 11A and 11B, the thickness direction of the semi-finished product 1*a* is in an up-down direction, which is the vertical direction. Thus, hereinafter, the thickness direction of the semi-finished product 1*a* may be referred to as the "up-down direction".

The rotatable blade 31 is reciprocated as follows. First, the cutting mechanism 30*a* is mounted in the reciprocating unit 21. Furthermore, the cutting mechanism 30*a* has a support platform 33*a* that supports the rotatable blade 31 that is driven to rotate, an appropriate guide member 35*a* such as a linear guide that guides the support platform 33*a* so as to be reciprocated in the up-down direction, and a drive mechanism (not shown) that reciprocates the support platform 33*a* in the up-down direction. Furthermore, the drive mechanism has a servomotor that functions as a driving source, and an appropriate motion converting mechanism that converts rotational motion of the servomotor into linear motion in the up-down direction and transmits it to the support platform. Accordingly, when the servomotor is rotated forward, the rotatable blade 31 is moved from the one end to the other end in the up-down direction as the forward path, and when the servomotor is rotated in reverse, the rotatable blade 31 is moved from the other end to the one end as the return path. Here, each stroke distance in the forward path and the return path is set to a distance that allows the entire rotatable blade 31 to completely cross the semi-finished product 1*a* in the up-down direction. Accordingly, the semi-finished product 1*a* is completely cut.

Incidentally, in this example, as shown in FIG. 11B, the position in the CD direction of the rotating shaft C31 of the rotatable blade 31 is offset from the edge 1*ae* of the semi-finished product 1*a* outward in the CD direction. The reason for this is similar to that described in the foregoing first embodiment. That is to say, this arrangement is made in order to prevent a part 33*ap* of the support platform 33*a* during cutting from interfering with the semi-finished product 1*a* and obstructing smooth cutting. Note that the radius R31 of the rotatable blade 31 is set at a value that is larger than Rs calculated using Formula 2 below such that the semi-finished product 1*a* can be cut throughout the entire width when the rotating shaft C31 is in a state significantly offset in the CD direction from a center position M1*a* of the semi-finished product 1*a* in this manner.

$$Rs = (\text{Width } W1a \text{ of semi-finished product } 1a) + (\text{Distance } DC31 \text{ in } CD \text{ direction between edge } 1ae \text{ of semi-finished product } 1a \text{ and rotating shaft } C31) \quad (2)$$

Figure 12B:
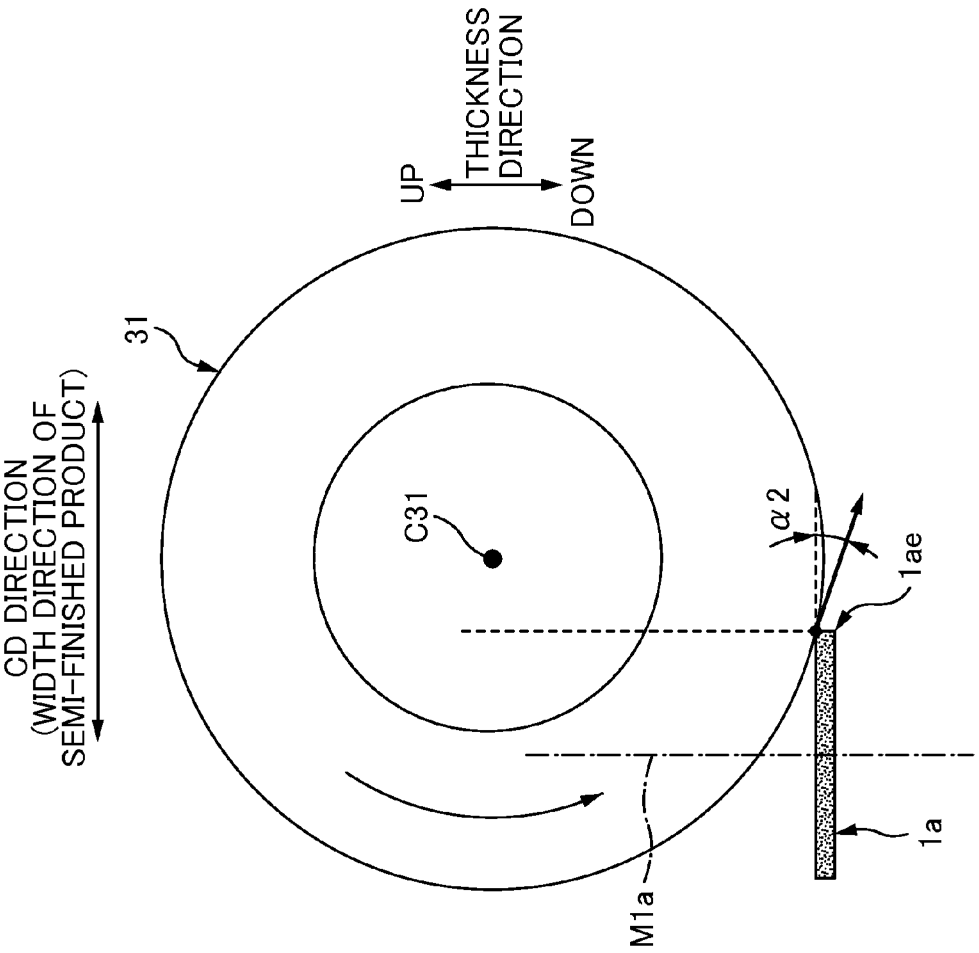
FIG. 12B is a view showing a positional relationship between the rotating shaft C31 of the rotatable blade 31 and the center position M1*a* in the width direction of the semi-finished product 1*a* according to the second embodiment.
Figure 12A:
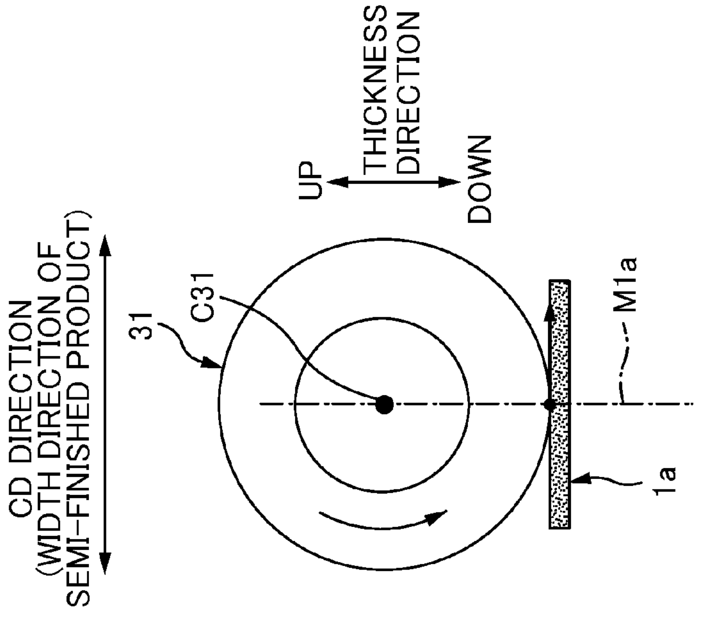
FIG. 12A is a view showing a positional relationship between the rotating shaft C31 of the rotatable blade 31 and a center position M1*a* in the width direction of the semi-finished product 1*a* according to a comparative example.

Here, when the positions are offset from each other in this manner, the operational effect of an improved cutting performance at the onset of cutting is also attained. FIGS. 12A and 12B are explanatory views thereof. In a comparative example in FIG. 12A, the position of the rotating shaft C31 of the rotatable blade 31 matches the center position M1*a* in the CD direction of the semi-finished product 1*a*, that is, these positions are not offset from each other in the CD direction. In this case, at the start of cutting as shown in FIG. 12A, the movement direction of the cutting edge of the rotatable blade 31 at a position where it comes into contact with the semi-finished product 1*a* is parallel to the width direction (the CD direction) of the semi-finished product 1*a*. Accordingly, a large cut resistance acts on the rotatable blade 31 at the start of cutting, and thus, the cutting performance becomes poor. On the other hand, as shown in FIG. 12B, when the position of the rotating shaft C31 of the rotatable blade 31 is offset from the edge tae of the semi-finished product 1*a* outward in the CD direction, the movement direction of the cutting edge at a position where it comes into contact with the semi-finished product 1*a* forms a predetermined inclination angle $\alpha$2 with respect to the width direction (the CD direction) of the semi-finished product 1*a* from the start of cutting. Accordingly, the cut resistance at the start of cutting can be reduced, and as a result, a good cutting performance can be achieved throughout the process from the start to the end of cutting.

Note that, as is clear from a comparison between FIGS. 4C and 11B, according to the second embodiment, the size of the rotatable blade 31 becomes larger than that in the first embodiment, and thus, the first embodiment is preferable in view of reducing the size of the rotatable blade 31.

Other Embodiments

In the description above, embodiments of the present invention have been described, but the foregoing embodiments are merely for the purpose of elucidating the present invention and are not to be interpreted as limiting the present invention. The invention can of course be altered and improved without departing from the gist thereof and equivalents are intended to be embraced therein. For example, modifications shown below are possible.

In the foregoing embodiments, the semi-finished product 1*a* associated with to the cleaning web member 1 has been shown as an exemplary continuous web 1*a*, but the present invention is not limited to such. That is to say, the continuous web 1*a* is not limited to the above as long as it has a plurality of fibers including tows and it is continuous in the transport direction.

In the foregoing embodiments, the cutting mechanism 30 and the regulating section 50 were both mounted in the reciprocating unit 21, and both the cutting mechanism 30 and the regulating section 50 were reciprocated in one piece in the MD direction by reciprocating this unit 21, but there present invention is no limitation to this. For example, the reciprocating unit 21 may be divided into two into an upper unit that is positioned above the semi-finished product 1*a* and a lower unit that is positioned below the semi-finished product 1*a*, and these units may be respectively driven by dedicated guide members and driving sources. Note that, in this case, the upper endless belt 52 and the rollers 53, 53 of the upstream side regulating mechanism 51 and the upper endless belt 56 and the rollers 57, 57 of the downstream side regulating mechanism 55 are mounted in the upper unit, whereas the lower endless belt 52 and the rollers 53, 53 of the upstream side regulating mechanism 51, the lower endless belt 56 and the rollers 57, 57 of the downstream side regulating mechanism. 55, and the cutting mechanism 30 are mounted in the lower unit. Furthermore, a driving source for reciprocating the upper unit in the MD direction and a driving source for reciprocating the lower unit in the MD direction are both controlled by the controller 80 based on the above-described synchronizing signal such that the upper unit and the lower unit perform the same reciprocal moving operation.

In the foregoing embodiments, the cutting edge of the rotatable blade 31 has not been described in detail, but this cutting edge may be a flat cutting edge that has no recess portion throughout the entire outer circumferential edge portion of the rotatable blade 31, or may be a cutting edge on which a plurality of recess portions are arranged side by side along the outer circumferential edge portion of the rotatable blade 31. Note that, when the latter cutting edge is applied, tows of the semi-finished product 1*a* can be cut while catching them with the recess portions, and thus, the cutting performance is further improved. Here, examples of such cutting edges having recess portions include a saw blade and the like, but the present invention is not limited to such. For example, the concept of the recess portions includes cut-out portions formed by cutting off part of the cutting edge at a depth exceeding 2 μm (the size in the radial direction of the rotatable blade 31) during polishing. Note that the depth is preferably 5 μm or less, because adhesion of molten residue of the tows to the cutting edge can be suppressed, and a high cutting performance can be maintained for a long time.

Furthermore, angle $\alpha$31 of the cutting edge (FIG. 4B), that is, the angle $\alpha$31 formed at the outer circumferential edge portion by the two blade faces 31*s*, 31*s* in the thickness direction of the rotatable blade 31 is preferably set within the range of 15 to 20°. This is because angles in this range can effectively suppress the chipping of the cutting edge during polishing, which easily occurs when the rotatable blade 31 is made of cemented carbide. Cemented carbide is used here in view of enhancing life and achieving a high cutting performance of the rotatable blade 31. Here, the rotating shaft C31 of the rotatable blade 31 is set parallel to the normal direction of the blade faces 31*s*, 31*s*.

The invention claimed is:

1. A continuous web cutting apparatus for cutting a continuous web that has a plurality of fibers including tows along a predetermined direction, the continuous web being cut at intervals in the predetermined direction while being transported along a predetermined track in the predetermined direction, comprising:

a disc-shaped rotatable blade member positioned for cutting the continuous web by moving in an intersecting direction that intersects the predetermined direction, while rotating about an axis of a rotating shaft along the predetermined direction without the rotatable blade member engaging an opposing member;

a regulating section that regulates a relative movement of the continuous web in the predetermined direction with respect to the rotatable blade member throughout a time during which the rotatable blade member is cutting the continuous web; and a reciprocating mechanism that moves both the rotatable blade member and the regulating section along a forward path and a return path that are parallel to the predetermined track;

wherein, in the forward path, an equal velocity region is set in which both the rotatable blade member and the regulating section move at a velocity value that is equal to a transport velocity value of the continuous web, and the rotatable blade member cuts the continuous web while moving in the equal velocity region.

2. A continuous web cutting apparatus according to claim 1, wherein the rotatable blade member moves along a width direction of the continuous web as the intersecting direction.

3. A continuous web cutting apparatus according to claim 2, wherein the rotatable blade member is reciprocatably guided in the width direction and a moving operation of the rotatable blade member along the width direction during regulation of the continuous web is performed in a direction opposite to an immediately previous moving operation of the rotatable blade member performed during regulation.

4. A continuous web cutting apparatus according to claim 1, wherein the regulating section has a feed mechanism that relatively feeds the continuous web in the predetermined direction with respect to the regulating section, the cutting apparatus has the continuous web fed thereto at the transport velocity value, and in a case where a movement velocity value takes as a positive value when the regulating section moves downstream in the predetermined direction and a movement velocity value takes a negative value when the regulating section moves upstream in the predetermined direction, the feed mechanism relatively feeds the continuous web in the predetermined direction at a velocity value obtained by subtracting the movement velocity value from the transport velocity value.

5. A continuous web cutting method for cutting, a continuous web that has a plurality of fibers including tows along a predetermined direction, at intervals in the predetermined direction, while the continuous web is transported along a predetermined track in the predetermined direction, using a disc-shaped rotatable blade member that cuts the continuous web by moving in an intersecting direction that intersects the predetermined direction, while rotating about an axis of a rotating shaft along the predetermined direction without the rotatable blade member engaging an opposing member, a regulating section that regulates a relative movement of the continuous web in the predetermined direction with respect to the rotatable blade member, and a reciprocating mechanism that moves both the rotatable blade member and the regulating section along a forward path and a return path that are parallel to the (predetermined track, the method comprising:

moving, in the forward path, both the rotatable blade member and the regulating section at a velocity value that is equal to a transport velocity value of the continuous web;

cutting the continuous web using the rotatable blade member during movement at the equal velocity value; and regulating the relative movement of the continuous web with respect to the rotatable blade member using the regulating section throughout a time during which the rotatable blade member is cutting the continuous web.

* * * * *